United States Patent [19]

O'Connor

[11] Patent Number: 4,918,532
[45] Date of Patent: Apr. 17, 1990

[54] FM RECEIVER METHOD AND SYSTEM FOR WEAK MICROWAVE TELEVISION SIGNALS

[76] Inventor: Edward O'Connor, 10212 Plymouth Ave., Cleveland, Ohio 44125

[21] Appl. No.: 27,435

[22] Filed: Mar. 18, 1987

[51] Int. Cl.[4] .................. H04N 5/455; H04B 1/10; H03D 3/24
[52] U.S. Cl. .................. 358/188; 455/208; 455/258; 455/207; 375/81
[58] Field of Search .................. 358/188, 167, 12, 15, 358/310; 455/305, 312, 208, 324, 207, 205, 86; 375/45, 46, 51, 81, 88, 82, 95, 97, 120; 381/2, 20, 5

[56] References Cited

U.S. PATENT DOCUMENTS

| | | | |
|---|---|---|---|
| 2,510,906 | 6/1950 | Reid | 455/207 |
| 3,544,899 | 12/1970 | Gusyatinsky | 455/207 |
| 4,087,756 | 5/1978 | Rogers | 455/208 |
| 4,293,818 | 10/1981 | Jarger | 455/208 |
| 4,523,324 | 6/1985 | Marshall | 455/324 |
| 4,672,636 | 6/1987 | Marshall | 455/208 |

Primary Examiner—Tommy P. Chin

[57] ABSTRACT

The threshold-extension receiving system combines parallel multiple direct-demodulating FM demodulators each demodulating the direct RF or IF signal, in conjunction with restricted bandwidth associated with each direct demodulator for removing the noise which is present from the band occupied at a given instant by a part of the modulated signal. Each FM direct-demodulator of the receiving system is tuned to a bandwidth centered on the instantaneous RF or IF frequency of a selected direct modulation component, rather than on the mid-frequency of the signal as a whole, such modulation component being treated as undergoing a relatively limited displacement within the total FM band occupied by the signal. The individual restricted bandwidths may be fixed or adaptively tuned. The individual direct FM components of an FM television signal are direct-demodulated by this system separately, rather than as a group, enabling a resultant lowering of overall FM threshold at which the receiver can operate properly, when the direct-RF or IF demodulated separated FM components are recombined to reconstruct a reproduced signal.

38 Claims, 3 Drawing Sheets

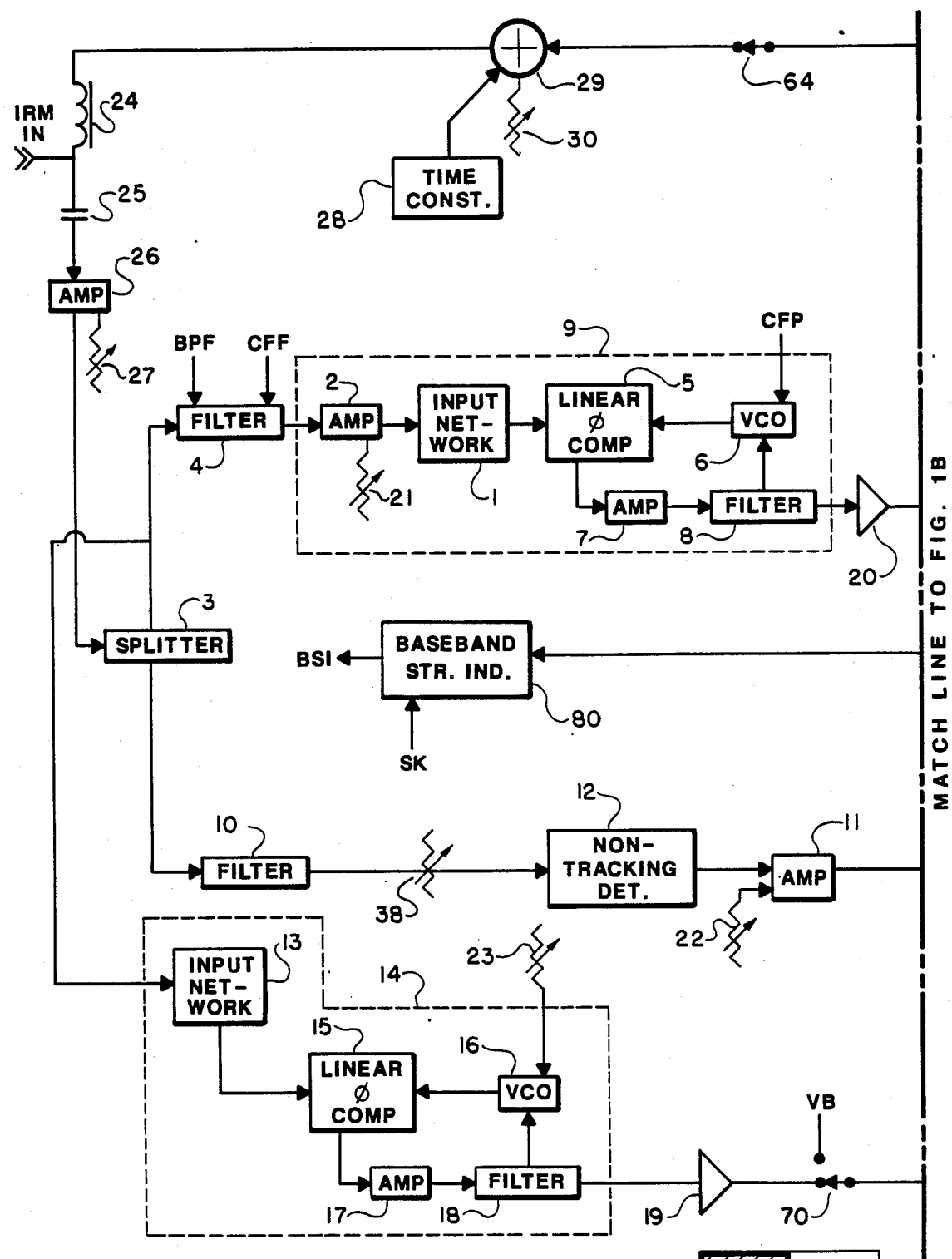
FIG. 1A
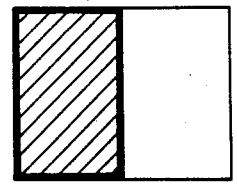

FM RECEIVER METHOD AND SYSTEM FOR WEAK MICROWAVE TELEVISION SIGNALS

BACKGROUND OF THE INVENTION

In a television transmission system, e.g., a satellite relay system, an FM, frequency modulation, system is often used. The reception RF, radio frequency, signal level in such a system is usually around the threshold level. Accordingly, if the reception signal level decreases slightly, that level becomes lower than the threshold level, and the picture and other aspects of a television signal is considerably deteriorated by spike noise peculiar to a television transmission, and it becomes difficult or impossible to reproduce a signal. Prior art receivers cannot usably receive signals from an obstructed dish such as an indoor dish, or produce usable reception from some of the weaker portions of a satellite footprint pattern.

In prior art practice, the individual modulation components of the signal are treated as if they were inseparable with respect to demodulation, and could not be separated during, but only after, demodulation. Thus a single demodulator, usually designated as a "video" demodulator, simultaneously demodulates video (picture), sync, color burst and audio subcarrier modulation components in prior-art receivers, with the audio subcarrier being further demodulated for its audio content by a subsequent demodulator, usually designated as an "audio" demodulator, operating from the output of the "video" demodulator, rather than directly from the RF or IF, intermediate frequency, signal. It will be shown that such individual modulation components of an FM signal can in fact be separated during demodulation and that such separation, contrary to the case of separation after demodulation, can lead to a lowering of overall system threshold.

In the prior art there are, as well as the conventional demodulation systems referred to above, references to systems for providing threshold extension for television signals by the use of a variable-bandwidth, i.e., adaptive, filter in conjunction with a conventional, e.g., limiter-discriminator, "video" demodulator, operating on all modulation components simultaneously, such that the bandwidth is large when the signal strength is at or above threshold, and narrow when the strength is below threshold. Like the conventional FM television receiving systems, such a system requires sufficient bandwidth, even in the narrowes mode, that no significant distortion results for any of the above-mentioned modulation components of the signal. Such a restraint on bandwidth narrowing makes it impossible to extend threshold sufficiently to reproduce many excessively-weak signals, and it is one object of the present invention to avoid such deleterious restraint on bandwidth, as will be indicated in more detail hereinafter.

SUMMARY OF THE INVENTION

The present invention pertains to a receiver that provides increased sensitivity to an FM video signal as compared to conventional receivers, and thereby produces usable pictures with color, sync and audio from weaker signal sources than conventional receivers.

A primary purpose of this invention is to receive usable pictures with color, sync and sound from an obstructed microwave antenna.

Another purpose is to allow usable reception of a satellite television signal from a weak portion of the satellite footprint.

Another purpose is to allow the use of a dish of smaller than standard size for the reception of digital scrambled signals.

Other related purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1B:
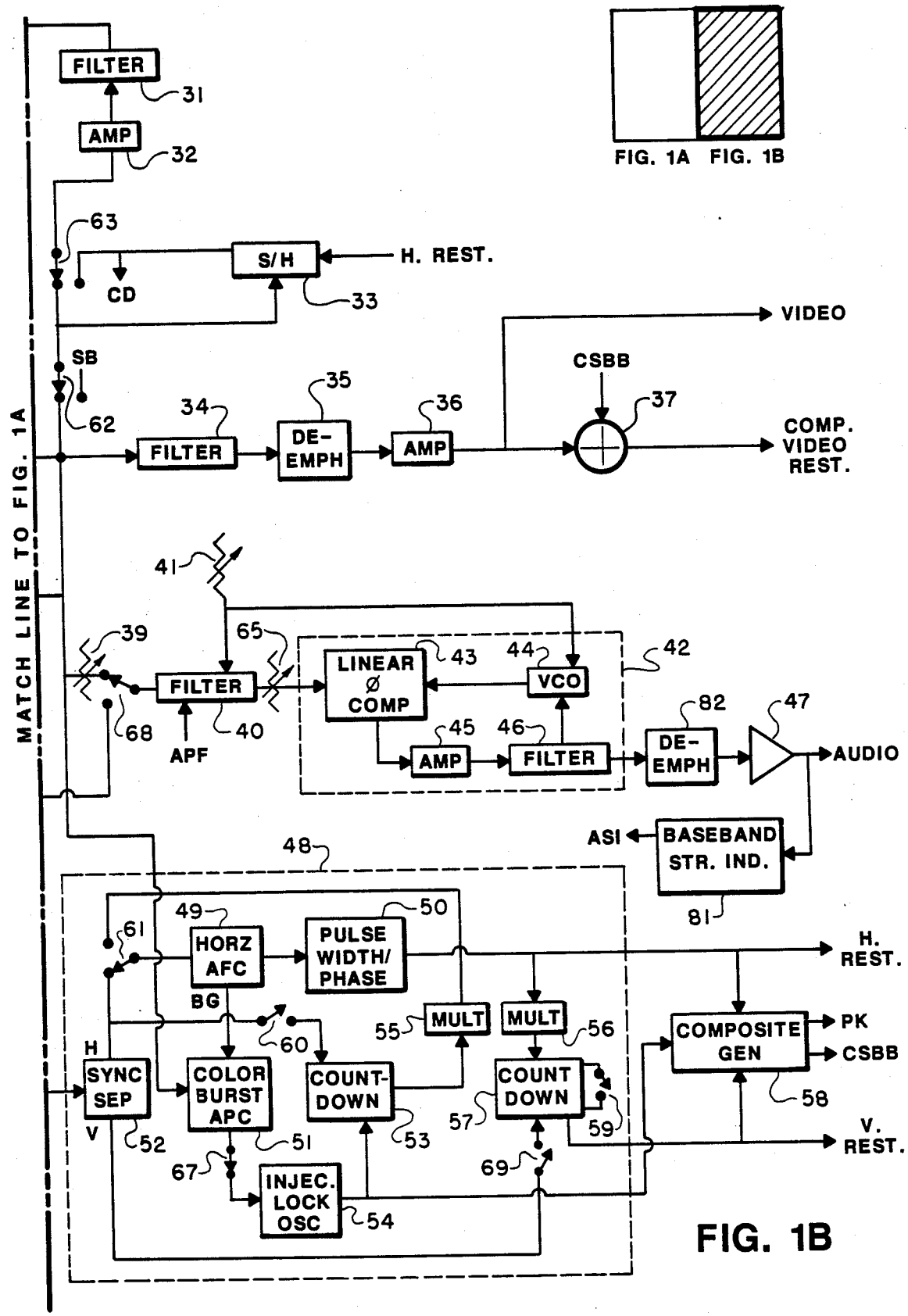
FIG. 1 which is in two parts, FIG. 1A and FIG. 1B, with interconnections being indicated by match lines, is a block diagram providing a diagrammatic illustration of the various functional components which together form an improved demodulation system according to the present invention.

The present invention relates to the reception of FM video signals from signal sources of low carrier-to-noise ratio (C/N).

In this type of operation, as from an obstructed microwave antenna or indoor dish, the carrier level received by the antenna is so low that the C/N of the output of the low-noise-amplifier (LNA) of the receiving system is below the processing capability of conventional receivers. There is little in the prior art relating to the utilization of obstructed microwave antennas, particularly at the very weak signal levels associated with satellite television. It is commonly believed by those skilled in the art to which this invention pertains that an indoor dish cannot operate. Contrary to common belief, however, when a microwave dish is obstructed, the signal, at least at C-band, is not necessarily blocked entirely, but is highly attenuated. For example, a building material, plywood, was used in radomes for early radar dishes. For operation at very low carrier levels, however, it is necessary to use a different signal-processing approach than that used in prior art receivers.

Now, an embodiment of a video receiver according to this invention will hereinafter be described with reference to FIG. 1 and FIG. 2.

The following description is given on a preferred embodiment of the invention, but it will be apparent that many modifications and variations could be effected by one skilled in the art without departing from the spirits or scope of the novel concepts of the invention, so that the scope of the invention should be determined by the appended claims only.

In FIG. 1A, a video I.F. signal received from the front end of the receiving system, designated IRM IN, is coupled to a linear I.F. amplifier means 26 by a coupling means, as for example, capacitor 25. A local-oscillator tuning voltage is also coupled to the downconverter of the front end (not shown) from the receiver by another coupling means, as for example, coil 24. The output of amplifier 26 is connected to filter means 4, via splitter means 3. The output of filter means 4 is connected to a demodulating means 9 consisting of amplifier means 2, input network means 1, linear phase comparator means 5, which is basically a linear multiplier, voltage-controlled-oscillator (VCO) means 6, loop amplifier means 7 and loop filter means 8. This demodulator means 9 constitutes a threshold extension demodulator. This type of demodulator means is employed because an obstructed microwave antenna typically produces a system C/N that is below the threshold of the conventional type of demodulators that are used in conventional receivers.

In satellite and other forms of microwave television, the video and audio are both superimposed, where the audio is an FM subcarrier, and transmitted by frequency modulation. For the purpose of demodulating this type of modulation, a discriminator or other FM detector is used. With a standard passive discriminator as used in many conventional receivers, the threshold or FM breakup point is the point at which the carrier and the thermal-agitation noise arising from the front end, i.e., the LNA and dish, attain the same amplitude, for at this point the noise assumes control of the FM detector. There is, however, an envelope associated with the thermal-agitation noise, so that the FM breakup takes the form of pulses. The noise envelope is expressed by a noise crest factor, which is the ratio of the amplitude of the highest noise peaks to the rms noise voltage. A standard value of crest factor is approximately 4. What is commonly-known as a "sparklie", or video noise pulse, occurs in a satellite television picture when the front-end thermal-agitation noise peak equals the signal carrier amplitude. At this point the noise takes over control of the detector from the signal for the duration of the noise pulse, and this constitutes a definition of the threshold of the FM television receiving system.

A threshold-extension demodulator as employed in the receiver of this invention can operate at C/N levels as much as several db lower than a conventional passive discriminator as used in many conventional receivers.

Threshold-extension demodulators work on a carrier-tracking principle that simulates or utilizes a variable-center-frequency filter of narrow bandwidth that tracks the instantaneous FM carrier frequency. They are thus able to produce an effective C/N improvement by rejecting thermal noise relative to the carrier amplitude. This class of FM demodulator includes the phase-lock FM demodulator (PLL), the FM negative-feedback demodulator (FMFB) and the variable-bandwidth dynamic-tracking demodulator (DTVB). Analyses have been reported to show that for optimally-designed phase-lock and FMFB or other carrier-tracking demodulators, threshold improvements are comparable. Since the FMFB and DTVB are expensive and difficult to design, a phase-lock FM type of demodulator is utilized in the receiver according to the present invention in a preferred embodiment.

An optimally-designed PLL maintains phase tracking at a C/N in a noise bandwidth which is lower than the threshold C/N of a conventional optimally-designed limiter-passive discriminator. The difference between the C/N levels is the threshold improvement available from phase-lock demodulation. It should be noted that, although there are standard formulas relating output S/N to input C/N for signals above threshold, the situation becomes more complicated for operation at or below threshold, and recourse to experiment becomes necessary. Experiments have been reported to have shown that the output of an optimally-designed phase-lock demodulator is roughly equivalent, at a 0 db input C/N, to that from an optimally-designed passive discriminator at +5 db C/N, yielding a 5 db improvement in threshold. This is a very large amount relative to satellite TV reception. It has also been found that an optimally-designed phase-lock demodulator will continue to operate below threshold, and that some trace of a picture will still be produced as low as 8.5 db below the C/N level at which sparklies first appear in the picture.

Many conventional satellite TV receivers use some form of passive discriminator, such as a delay-line or transmission-line discriminator. Other prior-art receivers use a quadrature-type of video demodulator, with similar threshold characteristics. This means that most conventional receivers exhibit a threshold deficiency of 5 db or greater, and this is one reason that conventional receivers are not able to produce a usable output from an indoor dish. Other reasons why conventional receivers cannot produce a usable output from such signal sources will be explained in detail hereinafter.

Returning to FIG. 1A, linear I.F. amplifier means 2 having gain control 21 is fed by said filter means 4, which typically has the response characteristics of a 1-or-2-pole filter and which serves a unique purpose that will later be discussed. Amplifier 2 serves to boost the input signal to the linear phase comparator 5 via input network 1 to assist in optimizing the operation of said demodulator means 9. One purpose served by gain control 21 is to effect a compromise between suppression of thermal noise and signal-deviation-handling capacity of the PLL carrier-tracking circuit comprising linear phase comparator 5, VCO 6, loop gain amplifier 7 and loop filter 8, since the bandwidth of a PLL is a function of the input signal drive level. The instantaneous frequency of the VCO means 6 is forced to equal the instantaneous frequency of the I.F. signal from input network 1 applied to the linear phase comparator 5, by the feedback applied to the VCO 6 by loop gain amplifier 7 via loop filter 8. Said loop filter 8 serves to determine, at least in part, the maximum modulation-frequency capability of the phase-lock FM demodulator circuit.

While little has heretofore been said about the limiter-type of circuit means that is utilized in conventional FM video receivers, it is now in order to treat this matter in the light of the nature of the type of very weak signal source with which the present invention is primarily concerned. In conventional receivers, considerable use is made of saturating amplitude limiting in front of the video FM detection means. However, a limiter is useful mainly for rejecting AM noise that is received with the signal or which may be generated by variations in frequency response of the I.F. of R.F. filters in the receiving system, and is actually of little value in suppressing the front-end thermal noise that is produced by an LNA. Since AM noise is seldom of prime importance in a small-dish microwave system operating at C-band or above, an I.F. limiter serves little purpose except to reduce the need for AGC. However, it is undesirable to employ a saturating limiter even for this purpose, relative to signals of the type considered herein, because any non-linearity introduced into an I.F. signal of very low C/N ratio, tends to deteriorate further the quality of said signal be producing cross-modulation between the carrier and the envelope-associated thermal-agitation noise, effectively lowering the I.F. C/N further and causing further deterioration of demodulator output S/N. Since a limiter is inherently non-linear, limiting has been eliminated so far as possible from the receiver system of the present invention. Limiter circuits were found to degrade, rather than improve, the quality of reception, for signals received with an indoor, obstructed dish, in regard to S/N of both video and audio. Also, for reasons of cross-modulation suppression, all signal-handling circuits, including amplifier 2 and linear phase comparator 5 have been made linear in this receiver. The foregoing constitutes additional differences between the receiver according to the present invention and conventional receivers that are further reasons that this receiver will produce a usable output from a severely-obstructed dish while a conventional one will not.

It should be noted in regard to the said linear phase comparator 5 that if the phase error, i.e., the difference from 90 degrees of the VCO and input-signal phases, is negligible, a limiter is not required to suppress AM on the input signal, since at lock the waveform phases to said comparator 5 will be in quadrature and the D.C. output of the comparator, which is proportional to the cosine of the phase difference, will be zero, regardless of the waveform amplitudes. While without a limiter the tracking range of the PLL will vary, this is not of direct consequence with regard to the signals herein considered. At or near center frequency, the phase error is usually negligible in a properly-designed PLL means. However, some limiting action may be acceptable if the circuit action is such that limiting occurs only for relatively high signal levels, and hence, C/N levels, and circuit action remains substantially linear and non-limiting for low C/N levels. Thus in some cases, a limiter, e.g., one incorporated in an I.C. which does not allow accesses to the internal circuitry but which may because of other, desirable properties be included in the said demodulator means, may be acceptable if non-linearity and limiting action are absent or at least reduced at sufficiently low input levels, i.e., those of the signals herein-considered. Of course, said linear phase comparator means need only be linear with regard to the signal input; the VCO input may admit of compressing or clipping by the internal circuitry of said means.

It should be noted here that a PLL suitable for the above-indicated demodulator means should be a direct-operating-design optimized for video demodulation. It may be, for instance, a hybrid module. There should be no digital frequency division in front of the PLL to lower the required center frequency of said PLL, since such a digital device is inherently non-linear and amplitude-limiting. Another factor associated with optimum video PLL design is that the re-acquisition time of the loop should be a minimum, since the duration of the video sparklies is partially a function of said re-acquisition time, i.e., the length of time required by the loop to re-acquire lock once it has been lost due to a noise pulse. Some conventional receivers have heretofore utilized a non-optimum PLL video demodulator, using an off-the-shelf I.C. not optimized for video demodulation purpose, primarily to obtain the required I.F. bandwidth at low cost, preceeded by a digital flip-flop to reduce the required center frequency as well as the I.F. maximum deviation by one-half. This design approach was reported to have produced an abrupt, high threshold, such that the use of, for example, a 4' C-band dish was impossible, although many passive designs have been capable of utilizing said dish size. The above-mentioned non-optimum PLL means, which also incorporated an internal limiter in the I.C., was also reported to have stretched the length of the video noise pulses. These disadvantages are eliminated by the means described and utilized in the receiver according to the present invention, which provides materially lower threshold, both for video and audio.

Referring again to FIG. 1A, the I.F. carrier signal containing inherent thermal-agitation noise is applied to filter means 4. A filtered signal therefrom having an improved C/N ratio is applied to amplifier 2 of the heretofore-described video demodulator means 9.

Although a PLL operates as if it contained a variable-center-frequency filter which tracks the I.F. instantaneous carrier frequency, its operation can still be improved in certain cases by a fixed-tuned external filter which rejects a maximal amount of thermal-agitation noise and passes only those carrier components essential to intelligible demodulation, to effect a compromise between noise suppression and intelligibility. A significant improvement in video noise rejection was found to occur by designing said filter means 4 as a wide-skirt (transition-band) filter of restricted bandpass, i.e., 3 db bandwidth, to improve the C/N ratio at the input of amplifier 2. The aforesaid bandpass of filter 4 can be as little as a few MHz, e.g., 5–10, while the skirts, or transition bands, can be for instance 2–4 times wider. Although this might seem, at first glance, to produce excessive video distortion, due to the satellite TV channel bandwidth specification of 20–40 MHz, most satellite transponders operate at much less than full FM deviation a larger percentage of the time, and a restricted-bandpass I.F. filter will pass a large portion of the video modulation a large percentage of the time, and a larger portion of said modulation will be passed by said wide transition bands at a lower C/N ratio, thus effecting a compromise between video distortion and video noise, allowing a material improvement in demodulator output S/N. The combination of the said filter means 4 with the heretofore-described video demodulator means 9 allows video distortion to be suppressed with the above-indicated mode of narrow-band filtering, because said demodulator PLL for reasons indicated heretofore tends to ignore the AM produced by the filter as the carrier frequency sweeps over its range of frequency response, even though amplitude limiting, for reasons previously discussed, is not employed. However, even with a phase-lock FM demodulator used in conjunction with the said filter means 4, the skirts of the filter cannot be made sharp, since then excessive distortion will occur when the video deviation of the signal becomes larger, due to a combination of excessively low filter output amplitude and unusably-low C/N. Wide filter skirts function to minimize this problem. In addition, an I.F. filter having wide skirts allows the picture to become progressively less distorted as signal C/N increases, since then the skirts will pass I.F. frequencies progressively farther from center frequency, at usable C/N ratios, and a phase-lock FM demodulator will, as indicated, tend to ignore the AM products of the filtering process. In effect, the bandwidth of the above-described combination adapts to the requirements of the available C/N. Thus, with this particularly-adapted type of filter in combination with the heretofore-described demodulator means, a picture improvement can be effected at very poor signal C/N ratios and a picture with further-reduced distortion can be produced at higher C/N ratios without the need to increase filter bandwidth, which would in turn decrease video S/N. This differs considerably from the type of I.F. filtering approach employed in conventional receivers, because a conventional receiver employs a filter with a flat top, i.e., pass band, and sharp skirts, which passes a bandwidth as large as 20–40 MHz and, while thus minimizing video distortion when used with a limiter-discriminator, at high signal C/N ratios, does little to effect reception at very low C/N ratios. The use of the heretofore-described type of filter in the heretofore-indicated type of combination produced a substantial improvement in video quality over a phase-lock demodulator alone, and is another significant difference between the receiver of the present invention and conventional receivers, and is another significant reason why this receiver can produce viewable pictures with color, sync and audio from an indoor, obstructed, small dish while a conventional one will not.

Referring again to FIG. 1A, the FM video signal coupled to filter 4 via splitter 3 is also coupled to input network 13 of a second, separate carrier-tracking threshold-extension demodulator means 14, which comprises further linear phase comparator 15, VCO 16 having center-frequency adjustment 23, loop amplifier 17 and loop filter 18. The video detection method heretofore discussed is capable of demodulating video along with the audio subcarrier at very low input signal C/N, but because the deviation capability of an FM demodulator may decrease as the C/N of the signal drops to threshold or below, and because the heretofore-discussed filtering is responsive primarily to the signal deviation band comprising the video portion of the modulation, compression of the sync pulses by the video demodulating means tends to occur. The sync compression problem with accompanying instability in the picture tends to occur in conventional receivers, even with C-band dish sizes as large as 8'. Along with the sync pulse compression also occurs compression of the color burst, since this is transmitted at approximately the same deviation level, i.e., in the same signal deviation band, as the horizontal sync pulses, on the horizontal blanking pedestals. To eliminate this difficulty, the above-indicated separate demodulator means 14 is incorporated into this receiver. This demodulator is also a direct-operating phase-lock demodulator, having a center frequency which is tuned by means of said adjustment 23 such that when the above-mentioned video demodulator 9 is frequency-centered on the significant portion of the video modulation of the input signal, the separate demodulator 14 produces optimum response to the sync pulses and color burst by being tuned to the deviation band of these portions of the composite modulation of the signal. In effect, various portions of the modulation of the FM video signal may be separately tuned for optimization purposes. Uncompressed sync pulses are required for adequate operation of subsequent sync recovery means. An uncompressed color burst is required to produce optimum color in the picture, and also to produce satisfactory results in connection with an alternate method for deriving sync, which will be described in detail hereinafter. By the use of the above-described separate demodulator means, this receiver according to the present invention is capable of producing stable sync from an indoor, obstructed 6' C-band dish, while a prior art receiver will often produce jittery sync from a conventionally-installed 8' dish.

As indicated above, the FM microwave signal modulated with composite video may be regarded as comprising, or including, one or more deviation bands, which incorporate the components of said composite video modulation, said deviation band or bands, which may overlap, being comprised in the total deviation range of the FM signal in accordance with the transmitter or transponder channel allotment. These deviation bands may substantially each be demodulated by separate demodulator means of optimally narrow bandwidth, e.g., responsive to video, sync, color burst or aural subcarrier or subcarriers, to effect an optimum compromise, in regard to the demodulation of each component of modulation under conditions of very low C/N ratio, between distortion of said components and the suppression of inherent thermal-agitation noise of the front-end electronics and antenna system.

The above-described separate sync demodulator means 14, utilized herein pursuant to the demodulation of the signal deviation band primarily encompassing the sync and color burst components of modulation, is a threshold-extension demodulator similar to the previously-described video demodulator. Although a filter could be used in conjunction with said separate demodulator in some embodiments of this receiver, the filter would require a center-frequency-tuning provision that tracks with the center-frequency tuning of the separate sync demodulator, and because performance of said demodulator 14 was found to be adequate to recover sync and color burst even at the C/N levels available from a highly-obstructed indoor C-band dish, a filter as indicated above was not employed in the embodiment of FIG. 1, although said filter could be utilized in alternate embodiments. A reason that said filter is not required is that the output of the sync demodulator 14 need not have as high a S/N as video demodulator 9, because the bandwidth of the sync pulses is no more than about 100 kHz and that required to process the color burst is only a few hundred Hz.

Referring again to FIG. 1A and 1B, the output of loop filter 18 is connected to a isolating buffer 19, which is then connected through a switch means 70, shown in an illustrative sense only, to sync separator means 52, which may be a standard type of sync separator means as employed in television receivers, which produces horizontal and vertical pulses by sync pulse peak detection. The line marked H from sync separator 52 is connected via switch means 61, shown in an illustrative sense only, to horizontal AFC means 49. This AFC, which may be of a type used in television receivers, and which may utilize a ceramic-resonator VCO for improved phase stability, may be utilized to operate from its own output pulse rather than from a flyback pulse. The output of horizontal AFC 49 is connected to a pulse width-phase circuit means to produce suitable restored horizontal sync pulses of proper width and phase. Line BG from said AFC 49 is connected to a burst gate input of color-burst APC means 51, which may be a standard crystal-controlled type as used in television receivers. The 3.58 MHz color subcarrier frequency output therefrom is connected via switch means 67, shown in an illustrative sense only, to the input of crystal-controlled injection-locked 3.58 MHz oscillator 54. The output of said oscillator 54 is connected to the trigger input of a countdown means 53, used for frequency division, the output of which is connected to the input of a frequency-multiplier means 55. When switch 61 is set so that the output of said multiplier is connected to the input of AFC 49, the output of oscillator 54 is divided by 455 by countdown means 53 and multiplied by 2 by multiplier 55 to produce the horizontal scanning frequency of 15.7 KHz in accordance with NTSC standards, and this is fed back to the horizontal means 49 to phase the color-burst gating input of means 51. When phasing is correct, the loop produces a horizontal frequency output which is free of phase jitter and therefore produces a stable picture. Methods to produce correct initial phasing will be described hereinafter. The output of pulse means 50 is connected to the input of multiplier 56, the output of which is connected to the trigger input of a second countdown means 57, also used for frequency division, the output of which is restored vertical sync. Said multiplier 56 multiplies the horizontal scanning frequency by 2 and this is divided by 525 by countdown means 57 to produce the vertical scanning frequency of 60 Hz in accordance with NTSC standards. The multipliers 55 and 56 could be employed ahead or after the associated countdowns. The color subcarrier frequency multiplication by 2 can also be omitted and one-half the horizontal frequency can be fed back to the horizontal AFC, which will then produce the horizontal frequency by frequency doubling in the loop.

Although usable sync can be produced by sync separator means 52 operating in conjunction with horizontal AFC means 49 and separate demodulator means 14, as indicated above, completely stable sync at the C/N levels of an obstructed dish require the above-described countdown means. These means may be implemented with, for example digital programmable counters. If a transponder using non-NTSC standards was being received, the countdowns and possibly the center frequencies of the horizontal and color burst APC means might have to be changed. This might be done by a programmable switching arrangement, in alternate preferred -embodiments, to accommodate, for example, Intelsat scanning standards.

The above-illustrated switching in the sync restorer block allows the sync to be produced either directly from the sync pulses, as in a monochrome transmission, or from the color burst frequency for complete elimination of sync jitter. Most satellite transponders now send the burst even during monochrome transmissions. To produce the correct picture phasing in color-burst-countdown operation, resets from sync separator 52 can be used to initialize the countdowns, by connecting the H line of sync separator 52 via switch means 60, shown in an illustrative sense only, to a reset input of horizontal countdown 53, and connecting the V line of said separator 52 via switch means 69, shown in an illustrative sense only, to a reset input of vertical countdown means 57. If the outputs of sync separator means 52 are insufficiently usable due to very low signal C/N, or because of sync not being transmitted, the horizontal and vertical phases can be made to drift manually, by means of switch means 67 and 59, respectively, shown in an illustrative sense only, until proper picture phase is observed. Opening switch 67 causes the output frequency of the injection-locked oscillator to shift slightly in frequency, causing the raster to drift horizontally across the screen. The said oscillator also fills in the gated-off APC waveform during the color burst. Setting switch means 59 to one position, say closing said switch, changes the vertical countdown by one count, causing the raster to drift vertically. Once set, the picture phases usually do not have to be reset as long as the system is tuned to one transponder. In some cases, sync resets might be obtained from sync initialization codes for certain digital transmissions, in alternate preferred embodiments. The sync restorer means 48 is representative only and other variations will occur to those skilled in the art.

Since many satellite transponders are now being digitally scrambled, it is a further object of this invention to facilitate the reception of these signals, by reducing the size of a dish required to operate an authorized decoder means, or to allow the use of a partially-obstructed dish of standard size, or to allow the use of an unobstructed dish of standard size in a weaker portion of the satellite footprint. At present, an unobstructed dish is required to have a minimum size of 8'-10' in the strongest part of the satellite footprint to be able to utilize a decoder. If a smaller dish is used with a conventional receiver, the output S/N is too low to allow the decoder to read the high-speed digital encoding pulses with a sufficiently-low error rate.

In the satellite digital scrambling systems, the audio is usually converted to high-speed digital pulses having a number of pulse levels, or decision levels, usually 2-4, said pulses being time-compressed into the retrace intervals, usually the horizontal sync intervals. Control pulses associated with the video scrambling are similarly transmitted. Thus the quality of demodulation of the encoding pulses is critical and operation must be at or above threshold, since excessive breakup noise cannot be distinguished from encoding pulses by the decoder.

While the utilization of the lower C/N of a digital signal as received by a smaller dish can be facilitated by the methods heretofore discussed, a further problem arises with many of the digital signals in that a severe form of dithering is often employed. While most satellite transponders dither their signals, i.e., superimpose a low-frequency waveform on the video, often a 30 Hz ramp, many of the digital transponders use a much more severe form of dithering in which the video baseline is offset at random by large amounts, in addition to the standard 30 Hz ramp, although still at lower frequencies, in the range of sync pule frequencies or below. The heretofore-described video I.F. filter means 4, having inputs BPF and OFF not previously mentioned, was in a heretofore-indicated basic embodiment fixed-tuned but in alternate preferred embodiments may be bandwidth-varied by input BPF. Said filter can be bandpass-extended to a minimum that may be required to allow demodulation of sufficient quality of the encoding pulses so that a decoder can be operated, but the above-indicated severe dithering will cause said filter means 4 to require an excessive bandpass to avoid distortion of said pulses. This in turn will require a dish of larger size, unless the dithering is corrected in a manner to be described hereinafter.

To correct the above-indicated dither requires the utilization of a control loop comprising sensing the video baseline level and feeding the sensed baseline level to a circuit utilization means in the receiving system such that correction of the dithered baseline is effected. However, to prevent the video I.F. deviation from exceeding the bandpass of the aforesaid filter 4, correction must be at I.F. rather than at video, precluding, for example, the use of a video clamper. The video waveform may be sampled at some appropriate portion thereof, and the sampled result utilized as the sensed video baseline level for dither correction in a control loop. The said appropriate portion of the video waveform can be the I.F., or average, level of the color-burst interval. This can be sampled by passing the video waveform through a low-pass filter to eliminate the subcarrier burst, and then employing a sample-and-hold gating means to sample the resultant I.F. levels. The samples are held by said sample-and-hold gate in the intervals between one sample and the next, and the resulting baseline voltage can be used to effect the required dither correction in a manner to be described below.

The aforesaid sample-and-hold means (S/H) must be gated by a sample/hold pulse. The pulse can be derived from the foregoing sync restorer means 48, which, as mentioned heretofore, does not require sync to be transmitted to produce restored sync. If the herein-described bandwidth-restriction and dither-correction method and apparatus were incorporated into a decoder means, of course, S/H gating could be derived from the internal sync circuitry of said decoder.

The dither-frequency voltage derived by the said S/H means can be used to effect dither correction in alternate preferred embodiments, by several illustrative methods, involving a control loop, now to be described. A first illustrative method (a) is to feed back said dither voltage as an AFC tuning-loop voltage to the local oscillator of the mixer of the downconverter of the receiving system, said downconverter having an output coupled to the IRM IN input shown in FIG. 1A. This restricts the deviation of the I.F. video carrier, thus desirably allowing the bandpass of said filter 4 to be minimized. In FIG. 1B, said method (a) is illustrated as follows: the output of sample-and-hold means 33, which receives an input from the output of buffer means 20 via switch means 62, shown in an illustrative sense only, and which is gated by the restored horizontal sync output H. REST., is fed via switch means 63, shown in an illustrative sense only, to the input of AFC tuning loop amplifier 32. The output of amplifier 32 is connected to the input of AFC tuning loop filter 31, the output of which is fed to an input of combiner 29, which adds the output of filter 31 to the downconverter tuning voltage derived from a tuning control 30. The output of said combiner 29 is then connected to the L.O. tuning input of the downconverter (not shown) via coupling means 24.

A second illustrative method (b) of producing the dither correction is to feed output CD of S/H means 33, connection not shown, to a center-frequency-determining input CFF, incorporated in alternate preferred embodiments, of the said filter means 4, such that the center frequency tracks the deviation of the video FM carrier, at the low frequencies of the dithering. The I.F. carrier then remains advantageously within the passband of said filter.

A third illustrative method (c) of producing the dither correction is to feed output CD of S/H means 33, connection not shown, to a center-frequency-determining input CFP, incorporated in alternate preferred embodiments, of demodulator means 9, such that the center frequency of said means 9 tracks the deviation of the video FM carrier, at the low frequencies of the dithering. In this case, the filter means 4 would be omitted from the embodiment, but the dither deviation is advantageously offset, thereby decreasing the deviation-handling requirements of the demodulator and tending to improve demodulation at low C/N.

A fourth illustrative method (d) of producing the dither correction is to feed output CD of S/H means 33, connection not shown, to said inputs CFP and CFF in conjunction, such that tracking relationship is maintained, at the low frequencies of the dithering. In this case, the advantages of methods (b) and (c) are combined. In each of the methods b-d, of course, a loop gain amplifier, not shown, is required in the control loop.

The above methods b-d would be advantageous if the L.O. of the downconverter was crystal-controlled or frequency-synthesized. Said methods could also be employed if the downconverter was tunable but AFC was not applied, or if AFC was produced by feeding back the average video level to a tunable downconverter. Those skilled in the art will appreciate, however, that even if the downconverter was crystal-controlled, a tunable second-conversion means, not shown, could be employed in alternate embodiments, to convert I.F. to I.F. and thereby allow the I.F. carrier frequency to be electrically-varied analogously to downconverter L.O. feedback, allowing dither correction by method (a). In method (b), the low-frequency dither component will be passed, but encoding pulse distortion will be opposed, allowing operation of the authorized decoder.

In some decoders, A.G.C. of said encoding pulses is utilized, so that various scalings of pulse levels may be possible in transmission. Thus the filter bandwidth would be set for the largest anticipated scaling. However, if substantially constant pulse scaling is employed, a multiple-tuned or comb type of filter structure may be advantageous if the frequency spacing between the decision levels is sufficiently great and/or the duration of said decision levels is sufficiently long. To avoid the video distortion which might be produced by a multiple-tuned filter structure, said filter structure may be utilized with a second, pulse I.F. demodulator, separate from the video I.F. demodulator. If the hereindescribed apparatus is external to the decoder, the output of said second demodulator may be gated into said decoder during retrace intervals, and the output of said video demodulator may be gated into said decoder at non-encoding-pulse intervals. If FM breakup is exhibited during pulse transitions, circuit utilization means can be incorporated to detect when said pulse demodulator is quieted and to gate the output of the demodulator at such intervals. Also, depending on the number of decision-levels and the type of demodulators utilized, n separate pulse-level demodulators, where n is the number of decision levels, each with a single-tuned input filter can be utilized analogously, in conjunction, or any combination of multiple-tuned and single-tuned filters and corresponding demodulators, for a total of n tuning frequencies, may be utilized analogously, in conjunction.

For optimum results in reducing dish size for digital signals, the combination of the heretofore-described dither suppression and bandwidth-restriction is advantageous, especially if a threshold-extension demodulator is employed, since the threshold extension of a carrier-tracking demodulator tends to decrease at higher modulation frequencies, e.g., the spectra of the encoding pulses, and dither suppression offsets this disadvantage.

In all of the foregoing instances the combination of a demodulator means and a filter means may be regarded as yet another overall demodulator means, utilized with a control loop for controlling the centering of the I.F. deviation band applied to said overall demodulator means.

Referring again to FIG. 1A and 1B, the video I.F. signal from splitter means 3 is applied to the input of filter means 10, the output of which is applied via level control 38 to the input of non-carrier-tracking detector means 12, the output of which is applied to the input of linear amplifier means 11 having gain control 22. The output of said amplifier means 11 can be applied via switch means 68, shown in an illustrative sense only, to the input of audio subcarrier filter 40, described hereinafter. This combination of means 10-12, 22 and 38 constitutes a second detector means to derive the audio subcarrier from the video modulation of the I.F. signal. The said second detector means does not operate on a carrier-tracking principle and was employed because it avoids the problem of maintaining loop lock at the high deviation rates of the higher video modulation frequencies, which in a carrier-tracking demodulator tends to reduce the amount of threshold extension at the higher modulation frequencies, e.g., the audio subcarrier frequencies. The filter means 10 is a restricted-bandpass, wide-skirt filter means similar to the heretofore-described basic embodiment of filter means 4, acting in combination with said means 12, which may be a simple quadrature detector, consisting of a linear multiplier means combined with a phase-shift network in a manner known to those skilled in the art, having sufficient bandwidth for satellite TV I.F. demodulation, e.g., 20-40 MHz. The video threshold of said quadrature detector was found to be considerably higher than that of video demodulator means 9. It was found, however, that the audio recovered via this detector was, although generally not as good as that recovered via said means 9, in some cases slightly better, as in certain cases where increases pr-emphasis was encountered. Amplitude limiting means were not used in association with said quadrature detector for the reasons discussed heretofore. Level adjustment 38 was employed to produce a sufficiently-low-drive level to prevent excessive crossmodulation and consequent reduction in audio output S/N resulting from non-linearity in said means 12, in accordance with the general principles of this invention wherein it has been realized that by the application of methods such as the avoidance of non-linearities, FM signals that were believed in prior art to be unreceivable may be successfully demodulated. Amplifier means 11 was employed to increase the audio subcarrier frequency output of means 12 to approximately the subcarrier level of demodulator means 9. While said non-carrier-tracking means 12 will not ignore the AM produced by filter means 10, resulting in a compression of the subcarrier waveform, the compression is less serious than video waveform compression would be, since the hereinafter-described filter means 40 will be rejected the subcarrier harmonics which result from said compression. The above-described combination of non-limiting filter means 10 and non-carrier-tracking detector means 12, utilized herein pursuant to the demodulation of a deviation band primarily responsive to the aural subcarrier component of modulation, said deviation band essentially overlapping the video deviation band, was capable of producing audio from an obstructed, indoor C-band dish while conventional receivers produce no audio at all from the same signal source.

The use of an aforesaid third demodulator means in the receiver can be especially advantageous if the bandwidth of the video demodulator means must be widened to accommodate a larger signal deviation range, thereby tending to degrade subcarrier C/N at the video demodulator output. Said third demodulator means may be implemented as indicated with a simple and inexpensive quadrature detector, or with any other suitably-responsive demodulator means.

Reference numeral 80 designates a baseband modulation peak-to-peak indicating means which may be employed in alternate preferred embodiments of the receiver according to the present invention. Said means 80 may be of a standard type, such as, for example, means comprising an amplifier means and a rectifying voltage-doubler detector means to provide a rectified voltage related to the A.C. peak-to-peak level of the baseband signal. This is utilized by connecting the output BSI thereof to the heretofore-indicated input BPF of I.F. filter means 4. Although in a basic embodiment filter means 4 is a fixed-selectivity, fixed-tuned filter, it can in some instances be advantageous if the selectivity of said filter is made variable in response to the video baseband amplitude, and thus to the FM deviation of the signal. Variation of filter bandwidth in accordance with other signal-related parameters such as signal strength can also be utilized, as has been done in prior art with regard to said signal strength, as, for example, if signals from both weak and strong satellites are to be received or if a signal subject to temporary fading, such as a Ku-band DBS signal, is to be received. However, if the bandwidth of said I.F. filter is made responsive to the peak or peak-to-peak excursions of the baseband video, the output S/N will be maximized during the low-contrast portions of the picture, but bandwidth will be automatically increased to accomodate large carrier deviations, as, for example, during a high-contrast portion of a scanning line such as that corresponding to an auto headlight, etc., if the feedback time delay and time constant are small. If these parameters are not small, baseband S/N can still be maximized under low-contrast conditions, when video noise is especially noticeable. Thus at all levels of signal strength, in contrast to prior art, optimum overall picture video S/N will be maintained continuously by this system of baseband modulation intensity feedback. In the case of a digital scrambled signal, the baseband-amplitude detecting means 80 may be rendered responsive to the amplitude of the maximum deviation level of the encoding pulses, exclusive of the video amplitude, by keying said means 80 at a keying input SK with keying pulses derived from the aforesaid sync restorer system. It may also be noted that filter bandwidth might be made additionally responsive in some embodiments to a pre-programmed dish-aiming microprocessor memory facility, for example, for taking into account differences in signal strength or channel bandwidths, which differ as between domestic and non-domestic satellites.

If an embodiment of this receiver employs a variable-selectivity filter means as described above, said filter may take any standard form. It may be continuously variable, or it may in some cases constitute a group of filters of different selectivities which are switched by electrical or mechanical means, in such manner that the switching-in of a filter corresponds to an increase in signal or baseband strength if said filter has a larger bandwidth, utilizing, for example, a multi-level comparator to sense signal or baseband strength.

Figure 2:
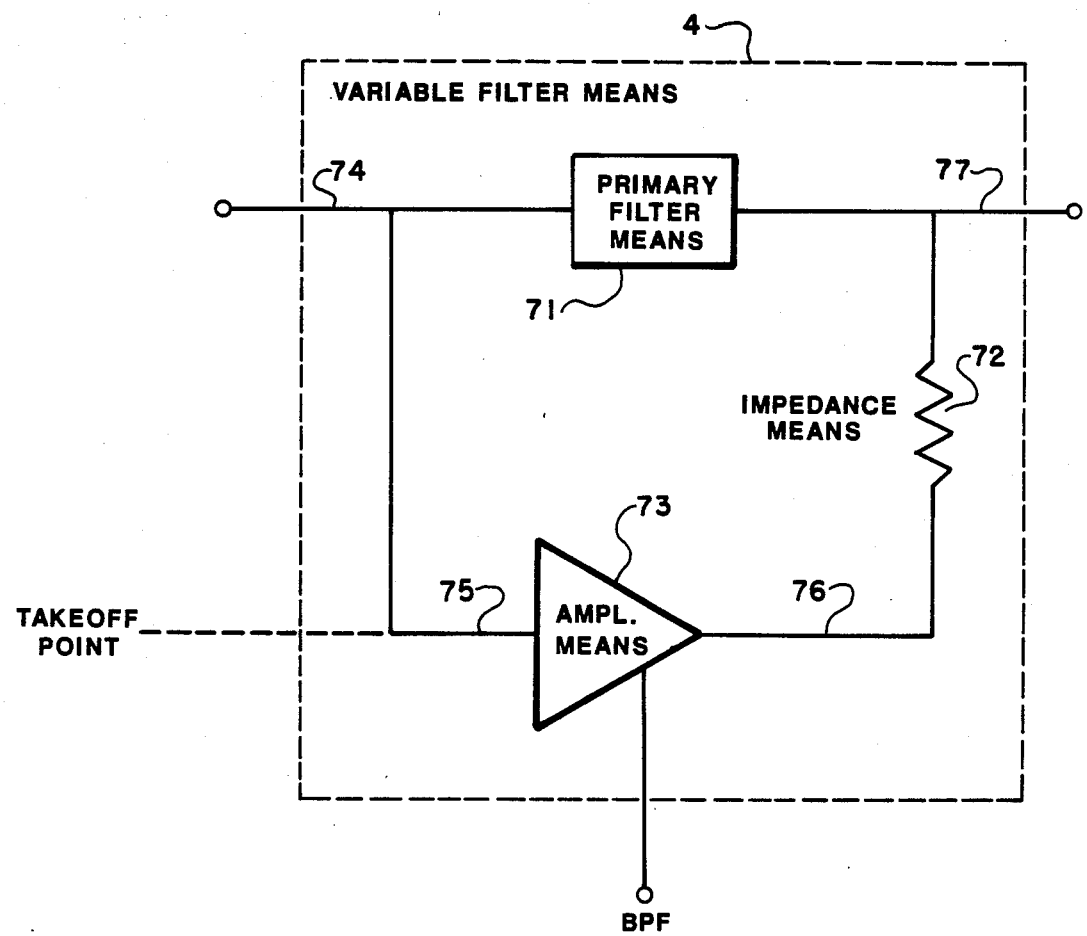
FIG. 2 is a schematic block diagram illustrating a filter apparatus suitable for use in certain of the blocks of FIG. 1.

Referring now to FIG. 2, wherein like numerals refer to like elements, there is shown a form of filter means 4 which may be utilized in alternate preferred embodiments of the present invention where bandwidth variation of said filter means may be advantageously employed. Said filter means 4 herein incorporates a primary filter means 71, which may be for example a passive filter, such as an LC filter, having an input 74 coupled to be responsive to the I.F. signal, an amplifier means 73 having a gain control input BPF and an input 75 coupled to be responsive to the I.F. signal, and output 76, coupled to the output 77 of filter means 71 by coupling impedance means 72, which may be in some embodiments, for example, a resistor. If the output impedance of the amplifier is suitable, impedance 72 may in some cases be replaced by a direct connection. Input 75 may in some embodiments be coupled directly to input 74, or in other embodiments may be coupled to a different I.F.-responsive point, such as an I.F. takeoff point closer to the input IRM IN, coupled to the front end, shown in FIG. 1A. The said coupling to said closer takeoff point can advantageously allow the utilization of a higher input impedance presented to the takeoff point by amplifier 73, as well as a smaller amount of loading of filter means 71 by said impedance 72, if said takeoff point has a higher I.F. level than said input 74. As the gain of amplifier 73 is varied from cut off or minimum to maximum, the overall response of filter means 4 broadens, from that similar to the unloaded response of filter 71 alone, to a maximum, having greater bandwidth and less sharp, more gradual transition bands, and wherein the center frequency and passband insertion loss desirably remain substantially constant in typical cases. This variable-bandwidth filter design is advantageous over prior art adaptive filter designs, in that it is easily implemented; for example, amplifier 73 may be in some embodiments a single-transistor stage and the gain input may be a simple base-bias control; in that it has inherently broad transition bands, tending to minimize video distortion; and in that it allows the use of a primary filter of optimum characteristics at narrow-band operation. Many prior art adaptive filters utilize a single-pole response, because a variable-bandwidth design is easiest to realize with a single pole; however, the frequency response characteristic of such a filter is typically not optimum in regard to picture quality, and a 2-pole filter is therein more desirable. Such a 2-pole filter can be advantageously utilized in the foregoing system illustrated in FIG. 2. A predetermined baseband level may effect full deviation response.

Returning again to FIG. 1A and 1B, the output of buffer 20 providing isolation to video demodulator means 9 is connected via level adjustment 39 and switch means 68, shown in an illustrative sense only, to the input of audio subcarrier filter 40 having center-frequency tuning adjustment 41, the output of which is connected via level adjustment 65 to the input of linear phase comparator 43 associated with audio subcarrier demodulator means 42, further comprising loop amplifier 45, loop filter 46 and VCO 44. Said demodulator means 42 is a threshold-extension carrier-tracking PLL demodulator means.

A threshold-extension demodulator is required for the demodulation of the audio subcarrier under the C/N conditions heretofore set forth, because although audio is not a problem at normal C/N levels, when the receiving system begins to operate at threshold or below, the audio subcarrier, which is produced by the foregoing video or subcarrier-modulation-responsive demodulators, acquires a very low C/N, due to FM breakup of the foregoing demodulator output at the frequency range of the audio subcarrier or subcarriers. The severity of the FM breakup of the audio subcarrier is such when operating from an obstructed indoor dish that an additional subcarrier filter is required, to be able to receive any audio at all from most transponders. In FIG. 1B, filter means 40 is connected to the input of demodulator means 42, where said filter means 40 has a bandwidth which is no greater than that required to accomodate the deviation of a single audio subcarrier. The center frequency of said filter 40 is, further, electrically-tunable and the tuning arrangement is such that the filter center frequency tracks the center frequency of demodulator means 42. Such center-frequency-tuning provisions could, of course, be omitted if there were only one subcarrier frequency to be received. The combination of filter 40 and demodulator means 42 tunes the range of audio subcarrier frequencies, usually 5–8 MHz. The filter 40 operates as a fixed-tuned filter of restricted bandpass but comparatively wide skirts at any particular audio subcarrier center frequency. It operates to reject a maximum amount of FM breakup noise and to pass only those subcarrier components required for intelligible demodulation. As the FM breakup noise decreases due to an increase in video I.F. C/N, as from the reception of a better signal, filter 40 in combination with demodulator means 42 will, in effect, automatically increase bandwidth to provide improved demodulation quality, as a consequence of the combination of restricted bandpass and wide transition bands, in a manner analogous to the action of the heretofore-described combination of means 4 and means 9, and in both cases, the filter transition bands are positively utilized, rather than being designed to be as narrow as the filter technology permits. The effectiveness of the above-indicated combination of filter means 40 and means 42 is such that audio is produced from an obstructed, indoor C-band dish even though, in addition to the audio subcarrier FM breakup associated with such reception, there are also the deleterious effects of subcarrier chopping, produced from the interference of the video, usually at video rates, and cross-modulation between the audio subcarrier and the color subcarrier, resulting from reduction of deviation-handling capacity of the video or subcarrier-modulation-responsive demodulator as a result of the very low signal C/N. Although filter 40 is fixed-tuned for any one subcarrier frequency which has been selected, the wide transition bands in combination with the phase-lock demodulator means 42 act to accommodate large differences in deviation ranges among subcarriers from different transponders and in addition the bandwidth of said means 42 may be varied by level adjustment 65 since, as is well-known, the effective bandwidth of a phase-lock demodulator is a function of the input drive level. An amplitude limiter is not employed in association with the above-described demodulator means 42, because any non-linearity introduced into the subcarrier signal tends to deteriorate the C/N of said subcarrier by introducing further cross-modulation between the subcarrier and the noise, and a limiter is, of course, an inherently non-linear device. Also for reasons of linearity, a linear, rather than a digital type of phase comparator is employed as phase comparator means 43. This may be, for example, a linear multiplier, such as a 1495. Some conventional receivers incorporate a PLL subcarrier demodulator, but this is primarily for the purposes of low cost and ease of tuning rather than for the purpose indicated herein, and often limiters or digital-type phase comparators are incorporated into the I.C.'s of these PLL circuits, producing deleterious effects with signals of very low C/N as indicated above. In addition, conventional receivers employ either no audio subcarrier filtering, or broad-band filtering having a 5–8 MHz flat response with sharp cutoffs that are made as sharp as technology permits, which does little to remedy any of the subcarrier breakup and cross-modulation effects associated with the inherent thermal noise of a signal of low C/N. The above-indicated differences between the design approaches of the receiver according to the present invention and conventional receivers are reasons that this receiver is able to produce usable audio from an obstructed, indoor dish while a conventional receiver will produce no audio at all from the same source.

In a basic embodiment described above, filter means 40 is essentially a fixed-tuned filter. However, in alternate preferred embodiments, a variable-bandwidth adaptive filter of the type shown for illustrative purposes in FIG. 2 may also be utilized in processing the aural subcarrier. The maximum bandwidth deviation of said subcarrier varies according to the transponder being received, and a feedback system as heretofore described with respect to the video baseband can analogously maintain optimum audio baseband S/N at varying deviation, and hence volume levels, and simultaneously accommodate various levels of maximum subcarrier deviation. In FIG. 1B, output ASI of audio baseband intensity indicating means 81 may be connected (not shown) to input APF for varying the bandwidth of filter means 40 in alternate embodiments. Feedback is advantageously provided to optimize the S/N of the baseband audio analogous to that heretofore described between output BSI of means 80 and input BPF of means 4 relative to the video baseband S/N. Any suitable type of variable-bandwidth filter may be utilized for filter means 40 as well as, for example, the filter arrangement illustrated by FIG. 2. All said filters may, of course, simultaneously provide for center-frequency tuning as well as for bandwidth variability.

It is now in order to treat of the before-mentioned FMFB and other carrier-tracking FM demodulators in the light of the threshold-extension methods heretofore-described relative to the receiver according to the present invention. The FM negative-feedback (FMFB) is essentially an FM receiver with video-bandwidth AFC, so that I.F. deviation is instantaneously reduced, allowing a narrow I.F. filter operating on a compressed I.F. bandwidth, thereby improving noise rejection and lowering threshold. Invariably the detector therein is a limiter-discriminator, for reduced video delay, and feedback is to the L.O. of the mixer of the receiving system. It will be appreciated by those skilled in the art, however, that feedback could be instead to an I.F.-to-I.F. converter as heretofore mentioned, within the I.F. demodulating part of the receiving system. This would permit the FMFB to be an I.F. functional block, which could then be employed in this receiver in place of, for example, a phase-lock FM demodulator. The variable-bandwidth dynamic-tracking (DTVB) employs a narrow filter having a center frequency which is forced to track the I.F. carrier at video speed, with a variable bandwidth made responsive to signal strength. The filter is employed in front of a limiter-discriminator tracking in response to the discriminator output. In some cases the filter has been an "oscillating limiter" having regeneration in the filter means responsive to signal strength. Both of the abovementioned carrier-tracking demodulators can be employed in this receiver in place of the PLL. They are, however, more difficult to design than a PLL, because cumulative circuit delays tend to produce excessive video delay in the feedback loop. In addition, both of these types are typically based on the limiter-discriminator basic demodulator and thus incorporate the potential disadvantages of a limiter in the demodulation of signals of very low C/N as heretofore discussed. Advantageously, however, the saturating limiter can be replaced in these designs by an AGC stage utilizing video-speed AGC characterized by wideband loop response and small loop delay, as has been done in certain non-carrier-tracking demodulator designs, in situations where saturating devices could not be made to work, because of operation at microwave rather than VHF frequencies, thus performing the AM-suppression function of a saturating limiter. It is also possible that the aforesaid limiter-discriminator could be replaced by PLL in the previously-mentioned demodulator designs, although difficulties might arise from loop instability. However, the AM products produced by the heretofore-described narrow filtering preclude the use of a discriminator alone in these designs. It may be noted that a restricted bandpass filter as utilized herein will in general have a bandwidth appreciably less than the deviation band to be demodulated, but skirts, or transition bands, that extend over at least said deviation band.

It should be noted that although the phase-lock FM demodulators discussed herein have been exemplified by basic configurations of functional blocks in FIG. 1, many variations are possible.

A PLL and a limiter-discriminator may be combined into an overall FM demodulator means, to incorporate the advantages of both, if the PLL VCO frequency is coupled to the input of the limiter-discriminator and the demodulated output is taken therefrom. Any non-linearity in the VCO voltage-to-frequency characteristic may then be effectively bypassed, and also any PLL phasing errors will be ignored as long as the PLL remains in frequency lock, while preserving the threshold extension of the PLL. In addition, any deficiencies in the output buffering of a PLL I.C. or module can be effectively bypassed, and in many cases the VCO may be proximity-coupled without requiring a direct connection to internal circuitry.

It may also be here noted that in a carrier-tracking demodulator the operation of the feedback loop may be specifically designed to optimize loop operation at the higher video frequencies, e.g., the spectra of the encoding pulses of a digital signal. It is known in the prior art in regard to designing the feedback loop to produce a zero delay at the low video frequencies, a 180 degree phase delay accompanied by a notch type of feedback attenuation characteristic at the mid-video frequencies, and a phase delay of substantially 360 degrees at the upper video frequencies, so that high feedback efficiency opposes the usual drop in threshold extension of many carrier-tracking designs at the upper modulation frequencies. However, among the said carrier-tracking designs, it may be that the DTVB is more suited to the demodulation of high-speed digital encoding pulses having several decision levels, since in this design the input frequency is substantially applied to the limiter-discriminator whether or not the filter tracking is ideal, while pulse fidelity depends critically on feedback action in the PLL and FMFB. It can be appreciated that threshold improvement may be realized in a limiter-discriminator design by utilizing a fast A.G.C. stage, as heretofore mentioned, to replace the saturating limiter, thereby decreasing deleterious cross-modulation effects for signals of low C/N.

In regard to the structure of the aforedescribed restricted-bandpass, wide-skirt type of filter means, while these have heretofore been described as band-pass filters they may, of course, be implemented in various ways known to those skilled in the art, including, for example, a combination of a high-pass and a low-pass filter or a plurality of notch filters with notch frequencies disposed over appropriate portions of the reject bands so as to effect the required pass-band and transition-band characteristics. A filter means may comprise, for example, a passive bandpass filter followed by a buffer stage, to improve efficiency by decreasing the loading on said passive filter. Such a filter means may also serve, for example, as the primary filter illustrated in FIG. 2. Of course, a filter having essentially full transponder channel bandwidth, e.g., 40 MHz, may be utilized in the present receiver, but with narrow filtering or the noise-rejection action of a PLL, this would serve little purpose in reducing the effects of thermal noise. In addition, the use of a SAN filter for such a full-bandwidth filter should be avoided where possible, because often the amplifiers necessary to make up the insertion loss of this type of filter degrade the I.F. C/N by introducing additional cross-modulation and/or noise.

It may be noted at this point in reference to the heretofore-discussed separate sync demodulator, that while some types of second detectors have been practiced, e.g., in television receivers, such practice has been primarily related to AM vestigial-sideband signals rather than to FM video signals, and has been primarily for design convenience, as for sync pulse polarity inversion, rather than for reasons of necessity, to correct unusable modulation-component demodulation conditions arising from FM breakup problems associated with very low C/N, and no process of tuning to modulation-component-responsive deviation bands is associated with such practice.

Reference numeral 34 in FIG. 1B designates a video low-pass filter means 34, the output of which is connected to the input of a standard de-emphasis circuit means 35, the output of which is connected to the input of a video amplifier means 36, the output of which is connected to a video output point marked VIDEO and a combiner means 37. A further improvement of the picture produced from this receiver was produced by utilizing said low pass to reject frequencies from about 4 MHz, the high end of the video band, to about 10 MHz, the nominal maximum frequency of demodulator means 9. Demodulator output frequencies in this range, while not directly visible on the screen, can tend to generate lower frequencies by cross-modulation effects in subsequent video circuitry and thus produce visible picture degradation under conditions of very low C/N, since the video noise pulses are likely to produce cross-modulation effects producing further degradation of video S/N. While a conventional receiver usually employs a standard type of passive multipole low-pass, the low-pass configuration utilized for said filter means 34 was a cascade of 3 notch filters, each comprising a buffer stage, such that the notch frequencies were distributed across the 4–10 MHz band, with the lowest-frequency notch being sharpest and the two higher being broader, the highest being broadest. While a conventional multi-pole low pass will exhibit substantial ringing effects in response to transient inputs, a notch filter or plurality of notch filters as described above has a minimum tendency to produce such ringing. It is advantageous to suppress such ringing, since the video noise pulses constitute transient inputs to the filter, at approximately the level of the maximum video amplitude, and thus tend to induce ringing, thereby further increasing cross-modulation and degrading video S/N by generating spurious lower frequency components. While a cascade of notch filters as described does not produce complete rejection of all out-of-band frequencies, substantial rejection may be produced, thereby effecting a compromise between out-of-band rejection and reduction of ringing effects.

It may be mentioned here that although an I.F. bandpass filter of specific characteristics as heretofore described, designated filter means 4 in FIG. 1A, provided a substantial improvement in very-weak-satellite-signal demodulation as employed in combination with means 9, incidentally providing also a reduction in terrestrial interference (TI) susceptibility, in-line I.F. filtering was not found to produce usable results from conventional TVRO receivers that were tested on an indoor, obstructed dish, even when excessively narrow bandwidths of such filtering were investigated. A combination of improvement means as heretofore discussed is required to produce material improvements over prior-art receivers in this type of very-weak-signal reception.

Other aspects of the receiver according to the present invention, which have not previously been pointed out, include composite sync generator means 59 operating to produce composite sync, by means well-known to those skilled in the art, with inputs from the restored horizontal and vertical sync outputs H. REST. and V. REST., and injection-locked oscillator 54, and providing an output CSBB, which is a composite waveform incorporating the horizontal and vertical sync and blanking and also the color burst on the horizontal blanking pedestal back porch, said composite waveform being connected to an input of combiner means 37, which acts in a standard manner to gate the video from the video amplifier means 36 with the above-mentioned composite waveform to produce a complete combined video and restored sync waveform to be fed to a monitor from output point marked COMP. VIDEO REST. or to a remodulator, not shown, in alternate preferred embodiments of the invention. The color burst input to means 58 can also be taken from the output of buffer 19 or buffer 20 in some embodiments, if desired. Generator means 58 may also in alternate embodiments produce a further output PK for keying input SK of means 80, as described heretofore, for improvement of the demodulation of digital signals.

Another aspect not mentioned heretofore is that gain controls 21 or 27 can be manual or electrical and in the latter case can be utilized to apply A.G.C. to reduce any overloading problem due to strong input signals. In addition, in some embodiments, if the feedback loop of said A.G.B. is sufficiently wideband and the loop time delay is sufficiently small, the A.G.C. can operate at video speed, thereby performing the AM rejection function of a saturating limiter without the associated non-linearity and cross-modulation effects.

An additional aspect of this receiver is time-constant means 28, the output of which is connected to an input of the heretofore-mentioned combiner means 29. This time constant, which is generated by standard means, is injected into the AFC tuning loop via means 29, to oppose the warmup drift of the system downconverter, which in many cases is such that excessive AFC loop gain would be required to suppress the drift if said means 28 was not used to provide this time-constant. A charging capacitor is usable.

Other aspects include input networks 1 and 13, which optimize interfacing to means 5 and 15, respectively, and which may take the form of simple RC networks which may produce an I.F. response tilt for overall response correction; de-emphasis network 82 which supplies the standard response roll-off to the output of subcarrier demodulator means 42, and buffers 19, 20 and 47 which provide isolation for demodulator means 14, 9 and 42, respectively. Means 47 provides demodulated audio to an output point designated AUDIO, in FIG. 1B.

The various switching means referred to in FIG. 1, by the condition in which they are set, serve to provide selection of receiver subsection means to provide optimum results with signals from various transponders on various satellites that may possess different formats. Such switching is representative only and can be implemented by manual or electrical means and the switching can be mechanical or electronic. Said electrical switching might be done under microprocessor control, for example. Switch means 64 can be utilized to produce manual tuning of the system downconverter or to select AFC feedback via switch means 63 from the average video, the horizontal sync pulses, or from the sampled output provided by S/H means 33, in conjunction with switch means 62, which allows AFC feedback to be derived from the output buffer 20 of the video demodulator means 9 or from the output buffer 19 of the separate sync demodulator means 14 when set to SB. Switch means 70 allows the sync restorer means 48 to operate from the output buffer 20 of the video demodulator 9 when set to VB or the output buffer 19 of the separate sync demodulator 14. Switch means 61 allows horizontal sync to be derived from the sync separator means 52 or from the horizontal countdown means 53 via multiplier 55. Switch means 67 causes the horizontal picture phase to shift slowly, or precess, when open, to facilitate manual horizontal sync phasing as heretofore discussed, and causes said phase to stabilize when closed. Switch means 59 produces the analogous result for the vertical picture phasing. Switch means 60 allows a reset to be applied to means 53 for automatic horizontal sync. Switch means 69 produces the analogous result for the vertical sync. Switch means 68 allows audio subcarrier to be derived from video demodulator means 9 or from third detector means 12.

Gain adjustment 27 of amplifier means 26 may be utilized to compensate for various LNA gains, which depend on the particular LNA and vary from less than 40 db to about 50 db. It is necessary to employ an LNA with sufficient gain that its thermal noise overrides that of the downconverter, which in some cases is significant, to avoid I.F. C/N degradation. An LNA used in tests had a gain of 50 db and a noise temperature of 85 degrees K.

A downconverter used in tests of a preferred embodiment of this invention was a single-conversion image-reject unit. Image rejection is required to reject the thermal-agitation image-band noise of the LNA, as well as to reject interfering signals. A 70 MHz I.F. frequency was used in tests but in alternate embodiments of course any I.F. frequencies may be employed, as well as any microwave or other R.F. front-end frequencies.

A feedhorn used in tests of an embodiment of the receiver according to the present invention was a scalar ring unit with motor-driven polarity probe. A dish used was an aluminum-mesh 6' C-band dish on an AZ/EL mount. Other sizes to 4' were also used. It was essential to aim the antenna accurately for both elevation and azimuth. The dish was aimed through a roof structure consisting of about 1" of solid wood and 1 or 2 layers of roofing materials. This of course constitutes a severe obstruction at the C-band microwave frequencies and it is not realized by those in the art that signals are usably receivable under these conditions. The transponders of several domestic satellites including Galaxy 1, Westar 5 and Spacenet 1 were receivable with usable quality with this installation using this receiver. It is well known that prior art receivers are unable to operate usably under such obstructed, small-dish conditions.

Other aspects are that if the signal is digitally encoded, a variable-bandwidth bandpass filter adapted to change or shift center frequency and/or bandwidth in response to keying may be made responsive to the pulse maximum level during the intervals of pulse transmissions, e.g., the horizontal sync interval, and responsive to video at other times, thus producing optimum filtering narrowness and hence low threshold during the encoding pulse intervals but optimizing S/N for the video. A filter adapted to shift response in this way to match two components can enable the use of a single FM demodulator to lower the usable C/N for digital signals while optimizing video, especially if the pulses have lower maximum amplitude than the video, for then the shifting filter response allows a lower C/N to be employed whereby encoding pulses can be properly demodulated, than if the same bandwidth had been employed for both pulses and video.

Additional aspects are that an information detection means utilized in conjunction with an adaptive filter, for controlling the bandwidth of an FM signal by controlling the bandwidth or bandwidth window of an adaptive filter in, for example, an FM demodulator apparatus/frequency detector means, may be in some cases a single means, or may in other cases comprise two such means, e.g., one with an input keyed to respond to encoding pulse amplitude during the pulse transmission interval, and the other with input keyed to respond to video amplitude, with both outputs multiplexed via the keying, so that instantaneous shift in adaptive filter response can produce immediate matching to the pulse FM deviation bandwidth, preventing pulses at the beginning of the transmission interval from being lost due to insufficient threshold improvement. The required minimum adaptive bandwidth can be preset by, e.g., a feedback offset adjustment associated with an information detection means, whereby the adaptive bandwidth can be made comparable or essentially the same as the maximum deviation range of the baseband-/demodulated modulation component, e.g., encoding pulses, when the amplitude of said baseband exceeds a predetermined level. At this predetermined level rejection of spike noise/sparklie FM breakup/video noise pulses arising from thermal noise is optimized while compression/clipping distortion of baseband waveform is minimized.

Still other aspects are that when demodulating a high-modulation-frequency baseband/FM signal modulation component such as an audio/aural subcarrier, a non-carrier-tracking detector/demodulator means used to maintain efficiency of demodulation by avoiding the loss of threshold extension that might be encountered at higher baseband frequencies in a carrier-tracking demodulator, may be, for example, a quadrature detector, limiter-discriminator, or even a discriminator without limiter, where the baseband waveform linearity is not critical, as for an audio subcarrier waveform where harmonics due to waveform distortion will be substantially rejected by a subsequent baseband-filtering bandpass filter means. This type of baseband signal filtering means may be tracking-tuned in conjunction with a tunable frequency detector to maintain matching between the center frequencies of said filtering means and said frequency detector means, and may be effectively fixed-tuned or predetermined in filtering response for a selected baseband/subcarrier frequency, while still being center-frequency tunable to select a desired subcarrier, utilizing means such as a conventional voltage offset and/or scaling means to maintain matching between center frequencies as subcarrier tuning is effected; however, if only one subcarrier need be received, center-frequency match may be maintained by means such as, e.g., a drift-compensating circuit component in a center-frequency tuning network.

Yet other aspects are that when phase-lock demodulator means are employed in this receiver, e.g., in the demodulation of a video carrier or a baseband audio subcarrier, in some cases in conjunction with an adaptive or fixed-tuned response filter means, said phase-lock means may be replaced by any other type of carrier-tracking demodulator such as an FMFB or DTVB heretofore discussed. Saturating amplitude limiting cannot then be as easily eliminated from the demodulator as with a phase-lock, since conventional FMFB's or DTVB's incorporate a limiter-discriminator comprising a saturating amplitude limiter; however, threshold extension of the demodulator input signal is still effected.

Additional aspects are that when a primary or basic-block bandpass filter is employed in an adaptive filter as discussed heretofore, where an input signal is injected into, or looped to, the output impedance of the primary filter via a variable-transfer-response means such as a gain-controllable amplifier and a coupling impedance, which may be a linear passive network means, which may in turn be a resistor or even a direct connection, an output may be coupled from the output of said primary filter or, in some cases, from a point intermediate of said impedance. The variable input-to-output signal transfer response means need not necessarily have gain greater than unity, e.g., a pin diode.

Still other aspects are that a time-constant start-up/warm-up drift-opposing means comprised in a AFC tuning loop or other AFC control loop may employ an RC charging circuit to generate a slowly-changing exponential D.C. drift-compensating output, but other means, such as a digital counter in conjunction with a D/A converter may be used. When power is applied to the receiver, the RC circuit begins charging; if power is interrupted, charge decreases but does not necessarily drop to zero if said RC circuit is properly impedance-isolated, so that when power is re-applied, charge does not start from zero. This tends to track the warm-up or start-up drift characteristics of the system downconverter with respect to power application and/or removal. If dithering correction is utilized in conjunction with said control loop, center-frequency-offset control feedback can control the centering of a deviation band of a modulation component of the FM signal, to maintain said band within the bandwidth window of the associated FM demodulator apparatus, thus retaining modulation power while tending to delete inherent thermal noise power and improving baseband S/N.

Yet other aspects are that keying for an information detection means, a sample-and-hold means/sample-and-hold gate means, or other means requiring keying may be derived from sync recovery means internally or externally as, for example, from the sync restorer means heretofore discussed, or from a sync subsection of a decoder apparatus.

Other aspects are that where a plurality of FM demodulator apparatus are utilized to separately demodulate a plurality of FM deviation bands of the FM signal which substantially incorporate or include a corresponding plurality of modulation components of the FM signal, e.g., video, sync, color burst, audio subcarrier, which in prior art were not regarded as individually FM-demodulatable, a recombiner means is required to re-unite said components into a complete restored baseband output. This can be a combining circuit means, or it may be, e.g., a monitor having separate inputs for some or all components. The means for coupling the individually-FM-demodulated components to the combiner may also comprise further processing means, such as a sync restoration means to improve the sync component where signal C/N is low, or a specific type of lowpass filter means as heretofore described for the video component. The tuning means enabling said FM demodulator apparatus to separately demodulate said components may be, e.g., a center-frequency-tunable filter to filter the input signal of a basic FM detector means, a tuning adjustment of a tunable discriminator, a VCO adjustment of a PLL, etc. It may be noted that components usually in substantially the same deviation band, e.g., sync and color burst, may depending on the transmission or transponder be in different deviation bands, especially in the case of scrambled signals. If the signal is dithered, it may of course be desirable to oppose the frequency de-centering of the deviation bands which are substantially inclusive of the relevant components of modulation, by feedback to a circuit utilization means for controlling center frequency offset by a sample of the video baseline, obtained by sampling/holding the video at appropriate points such as the color burst intervals as heretofore discussed, for standard signals, or at other intervals in the case of non-standard signals, e.g., scrambled. The said circuit utilization means may be, e.g., those heretofore described in association with methods (a) to (d).

Additional aspects are that a pattern of video signal vertical and horizontal pulses comprising the vertical and horizontal sync pulses and the vertical and horizontal blanking pedestal pulses may be produced by countdown means in conjunction with frequency multiplier means as heretofore discussed, in response to clocking by a signal having the frequency of the color burst, said burst serving as a piloting signal for said pattern of pulses in accordance with the countdown relationships of the NTSC or other relevant scanning/television system standards. A said pulse pattern may also be obtained from a phase-stabilized horizontal waveform derived from a horizontal AFC/APC, operating from an input from a conventional peak-detecting sync separator means, via countdown and multiplier means as heretofore discussed, responsive to clocking by a said phase-stabilized horizontal waveform in accordance with the countdown relationships of said scanning/television system standards. When a said video signal pulse pattern is coupled to a combiner means as mentioned above, along with a video signal, gating in response to keying is required in the combiner to exclude video during pulse intervals. Said keying may be obtained by means mentioned above, or internally in said combiner means, in response to, e.g., said blanking pedestal pulses.

Other aspects are that in a combination-type of phase-lock comprising a conventional phase-lock having the VCO coupled to the input of a conventional limiter-discriminator as discussed heretofore, even though the conventional PLL may sustain frequency lock there may be a tendency for varying phase errors to be exhibited between input and VCO waveforms as a result of incidental amplitude modulation of the FM input, or due to inherent noise of the signal. Said AM- or noise-induced phase errors will be reflected as noise or waveform distortion at the loop filter output even though the PLL remains in frequency lock; however, the above-mentioned coupling to said limiter-discriminator effectively bypasses this problem, while retaining the inherent threshold extension of the conventional PLL. But it is not necessary to employ a limiter-discriminator to detect the VCO frequency; any type of second frequency detector means may be utilized, e.g., a discriminator without limiter, a quadrature detector, another carrier-tracking demodulator, or another PLL. However, since a carrier-tracking demodulator has an inherent lock re-acquisition time, increase in overall lock reacquisition time in the phase-lock-plus-second detector combination can be prevented by utilizing a non-carrier-tracking demodulator as said second frequency detector means. For optimum suppression of deleterious cross-modulation effects harmful to noise C/N threshold extension, the operation of the above-mentioned PLL or other means must be maintained linear, as, for example, by preventing overdrive and/or by omitting saturating amplitude limiters from the design. Means for maintaining linearity may be, for example, an input drive adjustment as heretofore described, or means to provide a supply voltage high enough to preclude saturation.

Other aspects are that for a digital signal where it is desired to comb-filter the encoding pulse levels, or heights, referred to heretofore as decision levels, for the purpose of reducing thermal inherent noise, to thereby reduce the usable signal C/N, a plural filter means with a plurality of bandpass response peaks, one for each of the signal FM frequencies corresponding to said decision levels, may be employed. Said plural filter means may be a group of single-tuned or multiple-tuned filter means, using any technology, e.g., LC, SAW, all with inputs coupled to be responsive to the input signal, as by, e.g., tying all inputs together and coupling to the FM signal, and there may be an output from each single-tuned or multiple-tuned filter means, each coupled to a corresponding chosen FM demodulator apparatus, so that all decision levels are filtered and corresponding demodulated outputs generated; these demodulated outputs may then be coupled to, e.g., a multilevel comparator/combiner means, which may be of a known type, to produce an output indicative of the decision levels of the filtered encoding pulses. The number of FM demodulator apparatus may be a number from one to the total number of decision levels, which is typically 4 or fewer, to accommodate the design of the said plural filter means. It may be desirable to utilize an additional FM demodulator for the video to avoid picture distortion arising from the comb filtering.

Additional aspects are that in a carrier-tracking demodulator utilizing an improved feedback loop to optimize response at the higher modulation frequencies, e.g., the baseband frequency bandwidth spectrum of a modulation component such as a color subcarrier, or, advantageously, digital high-speed encoding pulses, the said loop may operate with zero or low phase delay at the low modulation frequencies, wherein feedback is high to allow loop lock to the FM signal D.C. carrier; a region in the intermediate modulation frequencies, where phase delay may be about 180 degrees but with a high loop attenuation, or notch response, to prevent loop instability at this phase delay, whereby the loop will not be modulation-responsive but will also not be unstable; and a phase delay of about 360 degrees in the spectrum of the desired modulation frequencies, as heretofore discussed, with high feedback to produce locking to said high modulation frequencies and thereby provide threshold extension at said high modulation, e.g., encoding pulse, frequencies. In demodulating encoding pulses transmitted in a horizontal sync interval, it will be appreciated that the loop is only required to lock to the D.C. carrier and to the high-speed pulses, since in said interval there are no intermediate video frequencies. Since intermediate modulation frequency responsiveness is herein suppressed, it may be desirable to utilize the above-described improved carrier-tracking demodulator for the encoding pulses, and another FM demodulator apparatus for the video, in accordance with methods heretofore discussed.

Further aspects are that in a limiter device operating by A.G.C. signal-levelling action at video bandwidth, to obtain limiting without saturation or non-linearity and accompanying cross-modulation deleterious to noise C/N threshold, the variable input-to-output signal transfer device utilized in the limiter means must be linear, at least for low C/N levels of the input signal, and may be a gain-controlled amplifier or other means, e.g., pin diode, not necessarily having a gain greater than unity. There is also comprised in this type of linear limiting means, of course, a means for detecting the level of the signal and a feedback loop operating at video speed between the level detector and the variable-transfer device. Said device should be maintained substantially linear and absent saturation for low C/N levels, but at higher C/N levels some degree of non-linearity may be permissible as mentioned heretofore in regard to PLL means.

Yet other aspects are that in an FM negative-feedback (FMFB) demodulator means, utilizing an intermediate frequency-to-intermediate frequency, or frequency-to-frequency, converter means, for purposes of replacing the conventional feedback to the local oscillator of the receiving system mixer, said local oscillator often being a klystron, with feedback to an apparatus self-contained in the demodulation apparatus or receiver, as heretofore discussed, said frequency-to-frequency converter must provide sufficient bandwidth for FM-modulating the center frequency of the signal to be demodulated, with sufficiently small delay that stable video-speed negative feedback may be utilized to compress the signal bandwidth analogously to conventional feedback to said local oscillator. The converter may be implemented with, for example, two mixers, each having a local oscillator of the same frequency, at least one being frequency-shiftable, with the input of the first mixer being coupled to the input signal and the output of said first mixer being coupled to the input of a conversion filter means, for example, a high-pass or bandpass filter means, to the bandpass of which the input signal is up-converted by said first mixer, the output of said conversion filter being coupled to the input of the second mixer, from the output of which the shifted input signal is taken, after down-conversion of said up-converted signal by said second mixer. A shift of the frequency of either local oscillator will shift the center frequency of the output signal, which will occupy substantially the same deviation band as the input signal. A high modulation rate can be attained by using a sufficiently high local oscillator frequency and matching band frequency range for said conversion filter means, and this will also tend to provide advantageous small loop delay. A microwave L.O. hybrid can be used for a converter oscillator. If desired, the two oscillators may be offset in frequency so that the shifted band may occupy a higher or lower band than he input signal. In this case the center-frequency tuning of the means heretofore mentioned may be accordingly adjusted.

Additional aspects are that in a carrier-tracking demodulator adapted to sustain threshold extension at encoding-pulse frequencies, any known method for adapting the feedback loop of the demodulator to sustain the extension at the spectrum of said encoding pulses may be used.

Further aspects are that in compensating for dither to effectively lower noise C/N threshold by constraining the modulation deviation to the bandwidth window of the FM demodulator, it will be appreciated by those skilled in the art that feedbackless compensation may also be utilized, by causing the bandwidth window of one demodulator to track the signal dither in response to a baseline-representative signal derived from the output of a second demodulator, both being fed by the same input signal. The second demodulator may have a wider bandwidth window than the first, because the required baseband bandwidth for sensing the dithering is low, and said second demodulator may also be of a less costly type than said first demodulator, since its requirements may be less stringent. Analogous control means suffice herein.

Other aspects are that an antenna used in conjunction with the receiver according to the present invention may of course be of any suitable type, including a dish, horn, or phased array.

The embodiments of the invention in which an exclusive property or privilege is claimed are defined as follows:

1. In a system adapted to receive and demodulate an FM signal, a method for threshold-extending the demodulation of said FM signal, comprising; performing at least one direct FM demodulating operation on said FM signal, characterized in that each said at least one performed direct FM demodulating operation comprises tuning to render the direct FM demodulating operation responsive to an FM deviation band which is substantially inclusive of a direct FM modulation component of said FM signal, said direct FM demodulating operation being primarily responsive to FM deviation frequencies included by said FM deviation band and less responsive to frequencies excluded by said FM deviation band; so that modulation power of said FM deviation band is substantially recovered while inherent noise power is rendered less; whereby the signal-to-noise (S/N) ratio of a modulation component of each said FM deviation band is increased.

2. The method according to claim 1, further characterized in that there is comprised a plurality of direct FM demodulating operations.

3. The method according to claim 2, further comprising recombining selected demodulated modulation components for reconstructing information carried by said FM signal.

4. An FM demodulating operation according to claim 1, further adapted to lower noise C/N threshold, further comprising, in combination, the steps of selectively filtering a said band of FM deviation frequencies corresponding to a modulation component, by filtering the said deviation band according to a predetermined filtering response, characterized by a restricted bandpass which is appreciably less than the bandwidth of the said deviation band, and transition bands which extend over at least the bandwidth of the said deviation band; and carrier-tracking FM demodulating the filtered FM deviation band; so that a compromise is effected by said filtering response between the suppression of inherent noise and distortion of an amplitude envelope of the filtered FM deviation band, while suppression of amplitude modulation consequent to said restricted filtering response, and extension of the noise C/N threshold relative to the filtered FM deviation band, is effected.

5. An FM demodulating operation according to claim 4, further adapted to lower noise C/N threshold, wherein said carrier-tracking demodulating operation is a phase-lock demodulating operation; further characterized in that there is further comprised maintaining said filtering and phase-lock demodulating substantially linear and absent saturating amplitude limiting, at least for low C/N levels of said FM signal; so that said filtering and said phase-lock demodulating cooperate to delete inherent noise power and to render low, distortion consequent to restricted bandpass filtering, while simultaneously preventing saturation-related cross-modulation effects deleterious to noise C/N threshold.

6. A direct FM demodulating operation according to claim 1, further adapted to lower noise C/N threshold at modulation frequencies of pulse modulation; wherein a said direct FM modulation component comprises encoding pulses; said direct FM demodulation operation comprising carrier-tracking demodulating the FM deviation band inclusive of said direct FM modulation component; utilizing feedback adapted to sustain low-modulation-frequency threshold extension, produced by said carrier-tracking demodulating, at higher modulation frequencies; characterized in that said feedback is arranged to sustain the threshold extension at modulation frequency spectrum of said encoding pulses.

7. A direct FM demodulating operation according to claim 6, wherein said feedback comprises providing a low feedback-loop phase delay at low modulation frequencies, a region of increased feedback-loop attenuation intermediate a modulation spectrum bandwidth, of said encoding pulses and a feedback-loop phase delay of about 360 degrees at a frequency higher than a frequency spectrum of said region; and characterized in that a frequency corresponding to 360 degrees delay is arranged to be within the modulation frequency spectrum of said encoding pulses.

8. A threshold-extension system adapted to receive and demodulate an FM signal, including; at least one direct FM demodulator apparatus, having an input coupled to be responsive to said FM signal; characterized in that each said at least one direct FM demodulator apparatus comprises tuning means adapted to render the direct FM demodulator apparatus responsive to an FM deviation band which is substantially inclusive of a direct FM modulation component of said FM signal, the direct FM demodulator apparatus being primarily responsive to FM deviation frequencies included by said FM deviation band and less responsive to frequencies excluded by said FM deviation band; so that modulation power of said FM deviation band is substantially recovered while the inherent noise power is rendered less; whereby the S/N of a demodulated modulation component of each said FM deviation band is increased.

9. A system according to claim 8, further characterized in that there is comprised a plurality of said direct FM demodulator apparatus.

10. A system according to claim 9, further comprising means for coupling demodulated modulation components from selected outputs of said plurality of said direct FM demodulator apparatus to a recombining means for reconstructing information carried by said FM signal.

11. A system according to claim 9, wherein one of said direct FM demodulator apparatus is responsive substantially to a direct video component of modulation of said FM signal and a second one of said direct FM demodulator apparatus is responsive substantially to a direct sync component of modulation of said FM signal, for reconstructing video and sync information carried by said FM signal.

12. A system according to claim 11, wherein a third one of said direct FM demodulator apparatus is responsive substantially to aural subcarrier component of said FM signal, for further reconstructing aural information carried by said FM signal.

13. A system according to claim 11, wherein at least one of said direct FM demodulator apparatus is a phase-lock FM demodulator means.

14. A direct FM demodulator apparatus according to claim 8, further adapted to lower noise C/N threshold, further comprising, in combination: a bandpass filtering means (4, FIG. 1) having an input coupled to be responsive to said FM signal, said bandpass filtering means having a predetermined filtering response for filtering said FM deviation band characterized by a restricted bandpass which is appreciably less than the bandwidth of said FM deviation band corresponding to a said direct modulation component, and transition bands which extend over at least the bandwidth of said FM deviation band; and a carrier-tracking FM demodulator means having an input coupled to be responsive to the output of said bandpass filtering means, the demodulated output being coupled from the output of the carrier-tracking FM demodulator means; so that a compromise is effected by said predetermined filtering response between the suppression of inherent noise and distortion of an amplitude envelope of the filtered FM deviation band, while suppression of amplitude modulation consequent to said restricted bandpass filtering response, and extension of the noise C/N threshold relative to the filtered FM deviation band, is effected.

15. An FM demodulator apparatus according to claim 14, further adapted to improve noise C/N threshold, wherein said carrier-tracking FM demodulator means is a phase-lock demodulator means; further characterized in that there is further comprised means for maintaining said bandpass filtering means and said phase-lock demodulator means substantially linear and absent saturating amplitude limiting, at least for low C/N levels of said FM signal; so that said bandpass filtering means and said phase-lock demodulator means cooperate to delete inherent noise power and to render low, distortion consequent to said restricted bandpass filtering, while simultaneously preventing saturation-related cross-modulation effects deleterious to said noise C/N threshold; whereby said noise C/N threshold is further extended.

16. An FM demodulator apparatus according to claim 15, further adapted to increase said suppression of amplitude modulation incidental to said restricted bandpass filtering, absent saturation-related cross-modulation effects, further comprising additional frequency detector means; in conjunction with said phase-lock demodulator means and means for coupling a voltage-controlled-oscillator (VCO) of said phase-lock demodulator means to the input of said additional frequency detector means, from the output of which a demodulated output is coupled; so that intrinsic non-linearity in said phase-lock demodulator means is bypassed from the demodulated output; and so that phase errors between said FM signal and a VCO signal of said phase-lock demodulator means are substantially prevented from passing to the demodulated output, thereby rendering said demodulated output substantially non-responsive to phase error induced by said amplitude modulation consequent to said restricted bandpass filtering response, while said phase-lock demodulator means sustains frequency lock; so that said amplitude modulation is suppressed from said demodulated output; whereby a reduction of distortion of the waveform of the demodulated output under conditions of low C/N level of said FM signal is effected, while extension of noise C/N threshold inherent in said phase-lock demodulator means is maintained.

17. A direct FM demodulator apparatus according to claim 8, further adapted to comprise variable signal filtering to optimize distortion relative to S/N of, a demodulated said direct modulation component of said FM signal, comprising, in combination: (a) a bandpass filter means having variable bandpass and having a signal input coupled to be responsive to said FM signal, and having also an input for controlling the bandwidth of a said FM deviation band corresponding to a said direct modulation component, (b) a frequency detector means coupled with the output of said bandpass filter means, for demodulating said FM deviation band, (c) information detection means (80, FIG. 1) characterized by being adapted for detecting information relating to the amplitude level of the demodulated output of said frequency detector means, having an input coupled to be responsive to the output of said frequency detector means and having an output coupled to said input of said bandpass filter means for controlling said bandwidth of said FM deviation band, an adaptive bandwidth of said bandpass filter means being controllable according to the output of said information detection means so that said adaptive bandwidth becomes narrower as said amplitude level becomes lower, and said adaptive bandwidth becomes wider as said amplitude level becomes higher, the adaptive bandwidth of said bandpass filter means being comparable to the bandwidth of said FM deviation band when said amplitude level is higher than a predetermined level, and the adaptive bandwidth of said bandpass filter means being narrower than said bandwidth when said amplitude level is less than said predetermined level.

18. A direct FM demodulator apparatus according to claim 17, further adapted to lower noise C/N threshold, wherein said FM signal includes a said direct modulation component comprising encoding pulses, further characterized in that said information detection means is rendered responsive to a maximum amplitude level of said encoding pulses during intervals of said pulses, and responsive to a level of other modulation during other intervals; said adaptive bandwidth of said bandpass filter means being controllable according to the output of said information detection means so that the adaptive bandwidth of said bandpass filter means is rendered sufficiently wide during the intervals of the encoding pulses for decoding to be effected of said pulses by a decoder apparatus, while simultaneously being maintained sufficiently narrow to delete inherent noise power; and so that said adaptive bandwidth is rendered matched to an FM deviation spectrum of said other modulation during said other intervals; whereby noise C/N threshold relative to said encoding pulses is lowered.

19. A direct FM demodulator apparatus according to claim 17, further adapted to lower noise C/N threshold, wherein filtering response, at least at narrowest bandwidth of said bandpass filter means having variable bandpass, said bandpass filter means providing filtering of said FM deviation band, is further characterized by restricted bandpass which is appreciably less than the bandwidth of said FM deviation band, and transition bands which extend over at least the bandwidth of said FM deviation band; so that a compromise is effected by said bandpass filtering response, at least at said narrowest bandwidth, between suppression of inherent noise and distortion of an amplitude envelope of a filtered said FM deviation band.

20. A system according to claim 8, 11 or 14, further comprising means (34, FIG. 1) for increasing S/N of a baseband signal derived from an output of a said direct FM demodulator apparatus; said means for increasing S/N being characterized in that there is comprised a plurality of filtering means each having a notch attenuation filtering response, said filtering means being coupled in cascade; wherein a first of said filtering means is coupled to be responsive to said baseband signal, and filtered baseband output is coupled from an output of a last said filtering means, said cascaded filtering means having notch frequencies disposed to substantially effect an overall low pass response to pass the frequencies of the baseband signal and to substantially reject other frequencies; wherein in consequence of notch structure, lowpass filter ringing effects consequent to inherent spike noise are substantially prevented; so that the generation, in subsequent baseband processing means, of cross-modulation effects consequent to said ringing effects and deleterious to baseband S/N, is suppressed.

21. An FM demodulator apparatus according to claim 8 or 9, further comprising means for lowering noise C/N threshold relative to a modulation component having a high modulation frequency; said means comprising, in combination: a bandpass filtering means (10, FIG. 1) having an input coupled to be responsive to said FM signal, said bandpass filtering means having a predetermined filtering response characterized by a restricted bandpass which is appreciably less than the bandwidth of the FM deviation band of the high modulation frequency component, and transition bands which extend over at least the bandwidth of the FM deviation band of said high modulation frequency component; a frequency detector means (12, FIG. 1), capable of substantially maintaining low modulation frequency demodulation efficiency at said high modulation frequency, and absent carrier-tracking feedback; having an input coupled to be responsive to an output of said bandpass filtering means; a demodulated output being coupled from an output of said frequency detector means; so that a compromise is effected by said predetermined filtering response between suppression of inherent noise and distortion of an amplitude envelope of said FM deviation band of said high modulation frequency component; and further characterized by comprising means for maintaining said bandpass filtering means and said frequency detector means substantially linear and absent saturating amplitude limiting relative to said FM signal, at least for low levels of C/N of said FM signal, so that cross-modulation effects deleterious to noise C/N threshold are suppressed.

22. An FM demodulator apparatus according to claim 21, wherein said frequency detector means is a quadrature FM detector means.

23. A system according to claim 8 or 12, further characterized in that means are comprised for the demodulation of an FM-modulated baseband signal derived from an output of a said direct FM demodulator apparatus, to decrease the influence of FM breakup noise of the output of said direct FM demodulator apparatus under conditions of low C/N of said FM signal, said means comprising, in combination, a bandpass filter means having an input coupled to be responsive to the FM baseband signal, said bandpass filter means having a predetermined filtering response characterized by a restricted bandpass which is appreciably less than maximum FM deviation range of said FM baseband signal, and transition bands which extend over at least the maximum FM deviation range of said FM baseband signal; a phase-lock FM demodulator means having an input coupled to be responsive to an output of said bandpass filter means, a demodulated output being coupled from an output of said phase-lock FM demodulator means; so that a compromise is effected by said predetermined filtering response between suppression of said FM breakup noise and distortion of an amplitude envelope of said baseband signal; while suppression of amplitude modulation consequent to said restricted bandpass, and extension of C/N threshold relative to a filtered baseband signal, is effected; and means for maintaining said bandpass filter means and said phase-lock FM demodulator means substantially linear and absent saturating amplitude limiting relative to said FM baseband signal, so that cross-modulation effects deleterious to demodulated-baseband S/N are suppressed; so that said bandpass filter means (40, FIG. 1) and said phase-lock FM demodulator means cooperate to delete FM breakup noise power and to suppress distortion consequent to said restricted bandpass filtering, while simultaneously preventing saturation-related cross-modulation effects deleterious to noise C/N threshold and further comprising means for maintaining matching of center frequencies of said bandpass filter means, said phase-lock FM demodulator means, and center frequency of said FM baseband signal.

24. A system according to claim 8 or 11, further characterized in that means are comprised for the demodulation of a synchronizing baseband signal derived from an output of a said direct FM demodulator apparatus, to decrease the influence of inherent noise under conditions of low C/N of said FM signal in regard to inducing phase instability of said synchronizing baseband signal, wherein a demodulated modulation component comprises a piloting component a frequency of which is in predetermined relationship to video line-rate and field-rate deflection synchronization frequencies of said FM signal; said means comprising: means (51, FIG. 1) for deriving a waveform of said frequency of said piloting component from said output of said direct FM demodulator apparatus, and means for deriving from the piloting frequency waveform a pattern of video signal sync-related pulses in accordance with a predetermined relationship between the piloting frequency and scanning frequencies of said FM signal, that is comprised in scanning standards associated with said FM signal; whereby sync recovery is effected and sync phase instability is suppressed.

25. A system according to claim 8 or 11, further characterized in that means are comprised for the demodulation of a synchronizing baseband signal derived from an output of a said direct FM demodulator apparatus, to decrease the influence of inherent noise under conditions of low C/N of said FM signal in regard to inducing phase instability of said synchronizing baseband signal; wherein said synchronizing baseband signal includes a video line-rate synchronization component; said means comprising: peak-detection means (52, FIG. 1) responsive to said output of said FM demodulator apparatus, for deriving a peak-detected horizontal sync waveform, means (49, FIG. 1) for deriving from the peak-detected horizontal sync waveform a phase-stabilized horizontal-frequency waveform, means for deriving from the phase-stabilized horizontal frequency waveform a vertical frequency waveform in accordance with a predetermined relationship between a horizontal frequency and a vertical scanning frequency of said FM signal that is comprised in scanning standards associated with said FM signal; and means for deriving from said phase-stabilized horizontal-frequency waveform and said vertical frequency waveform a pattern of video signal sync-related pulses; whereby sync-recovery is effected and sync phase instability is suppressed.

26. A system according to claim 8, further adapted to lower noise C/N threshold with regard to an encoded signal, wherein a modulation component of said FM signal comprises encoding pulses having a plurality of decision levels; further comprising: direct filter means coupled to be responsive to said FM signal and having a plurality of bandpass filtering response peaks each of which is adapted to tune one of a set of FM signal deviation frequencies corresponding to the decision levels, thereby deleting inherent noise relative to said decision levels; said direct filter means further providing at least one filtered output, each said at least one filtered output corresponding to at least one of said bandpass filtering response peaks, and each said bandpass filtering response peak corresponding to said at least one filtered output; each filtered output being coupled to an input of a selected corresponding said at least one direct FM demodulator apparatus; and means for coupling an output of each coupled said at least one direct FM demodulator to means for deriving an output indicative of each demodulated decision level of said plurality of decision levels.

27. FM demodulator apparatus according to claim 8, adapted to lower noise C/N threshold relative to a keying-related modulation component; of said FM signal comprising direct adaptive filter means having a signal input coupled to be responsive to said FM signal, and being characterized by having an input responsive to a keying signal for shifting filtering response of the adaptive filter means; and a frequency detector means coupled with an output of said adaptive filter means, for demodulating the keying-related modulation component, from an output of which a demodulated output is coupled; wherein time intervals of said keying signal correspond to time intervals of the keying-related modulation component of said FM signal, the filtering response of said adaptive filter means being controllable according to said keying signal so that a filtering response bandpass window of said adaptive filter means shifts in response to said keying signal to match a deviation frequency spectrum of said keying-related modulation component; and to match a spectrum of another modulation component in time intervals between the time intervals of said keying-related modulation component; whereby noise C/N threshold is lowered consistent with a bandwidth requirement of each modulation component; and wherein said keying signal is derived from a sync recovery means.

28. A direct FM demodulator apparatus as in claim 27, wherein said keying-related modulation component comprises encoding pulses, and said another modulation component comprises video modulation.

29. A system according to claim 8, further adapted for lowering noise C/N threshold relative to a deviation frequency spectrum of a said FM deviation band dithered by a dithering modulation component of said FM signal, comprising means for matching the deviation frequency spectrum to bandwidth window of a said direct FM demodulator apparatus responsive to said FM deviation band of said FM signal; said means comprising a center-frequency-offset control loop for controlling center-frequency-offset dithering of said FM deviation band; said control loop including a circuit utilization means for controlling a center frequency of said FM deviation band relative to the bandwidth window of said direct FM demodulator apparatus; means (33, FIG. 1) for deriving from said FM signal a signal representative of a baseline associated with said dithering modulation component; and means for feeding back a baseline-representative signal to said circuit utilization means so that the control loop maintains said FM deviation band substantially centered within the bandwidth window of said direct FM deviation frequency spectrum demodulator apparatus; demodulation distortion consequent to dithering of said FM deviation band thus being suppressed, while inherent noise is deleted.

30. A system according to claim 29, wherein said means for deriving said baseline-representative signal comprises a keyed sample-and-hold means, for sampling demodulated output, from said direct FM demodulator apparatus, at appropriate intervals of modulation carried by said FM deviation band; and for holding each sample in an interval between said sample and a subsequent sample; whereby a signal representative of said baseline associated with said dithering modulation component, being said baseline-representative signal, is derived; and wherein keying of said keyed sample-and-hold means for recovering sync from said FM signal is derived from means.

31. A system according to claim 29, wherein a modulation component of said FM deviation band comprises encoding pulses.

32. A direct FM demodulator apparatus according to claim 8, further adapted to suppress incidental amplitude modulation from said FM signal, absent limiter-associated saturation/cross-modulation effects; comprising phase-lock demodulator means having an input coupled to be responsive to said FM signal; and characterized by further comprising an additional frequency detector means; and means for coupling a voltage-controlled-oscillator (VCO) of said phase-lock demodulator means to an input of said additional frequency detector means, from an output of which a demodulated output is coupled; so that intrinsic non-linearity in said phase-lock demodulator means is bypassed from the demodulated output; and so that phase errors between an input signal and a VCO signal from said VCO of said phase-lock demodulator means are substantially prevented from passing to said demodulated output, thereby rendering said demodulated output substantially non-responsive to phase error induced by said incidental amplitude modulation, of the phase-lock demodulator means, while said phase-lock demodulator means sustains frequency lock; so that said incidental amplitude modulation is suppressed from said demodulated output; whereby a reduction in distortion of the waveform of the demodulated output under conditions of low C/N of said FM signal and lowering of noise C/N threshold inherent to said phase-lock demodulator means is effected.

33. A direct FM demodulator apparatus according to claim 32, wherein said additional frequency detector means is absent carrier-tracking feedback, so that lock re-acquisition is absent from said additional frequency detector means; whereby increase of lock re-acquisition time in said direct FM demodulator apparatus, comprising said phase-lock demodulator means and said additional frequency detector means, is suppressed.

34. A direct FM demodulator apparatus according to claim 8, further adapted to lower noise C/N threshold at modulation frequencies of pulse direct FM modulation wherein a said direct FM modulation component comprises encoding pulses; said direct FM demodulator apparatus comprising carrier-tracking demodulator means, having an input coupled to be responsive to said FM signal, including a feedback loop having a low phase delay at low modulation frequencies, a region of increased attenuation intermediate a modulation spectrum bandwidth, of said direct FM modulation component and a phase delay of about 360 degrees at a frequency higher than a frequency spectrum of said region; characterized in that a frequency corresponding to 360 degrees phase delay is arranged to be within a frequency spectrum of said encoding pulses of said direct FM modulation component.

35. A direct FM demodulator apparatus according to claim 8, further adapted to lower noise C/N threshold; comprising a limiter-discriminator means having an input coupled to be responsive to said FM signal, and inclusive of a limiter means for amplitude limiting, said limiter means having a variable input-to-output signal transfer response, wherein said amplitude limiting is obtained by AGC action performed by AGC loop feedback, having a loop bandwidth which is substantially equal to baseband bandwidth of a said direct FM modulation component, and having small loop delay; so that said amplitude limiting is effected over the baseband bandwidth of said direct FM modulation component; and characterized by comprising means for maintaining said limiter means substantially linear and absent saturation, at least for low C/N levels of said FM signal; so that said amplitude limiting suppresses cross-modulation effects deleterious to lowering said noise C/N threshold.

36. A direct FM demodulator apparatus according to claim 8, further adapted to provide FM-negative-feedback threshold-extension demodulation with a self-contained control loop, further comprising: a limiter-discriminator means; and a bandpass filter means having a bandwidth narrower than bandwidth of a said FM deviation band corresponding to an FM modulation component to be demodulated; characterized by comprising a frequency-to-frequency converter means having a signal input coupled to be responsive to said FM signal; an output of said converter means being coupled to an input of said bandpass filter means, an output of which is coupled to an input of said limiter-discriminator means, from an output of which a demodulated output signal is coupled; wherein said converter means comprises an input for shifting a frequency spectrum of said FM deviation band; and means for applying feedback from an output of said limiter-discriminator means to said input for shifting the frequency spectrum of said FM deviation band.

37. A direct FM demodulator apparatus according to claim 8, further adapted to lower noise C/N threshold; comprising a carrier-tracking demodulator means having an input coupled to be responsive to said FM signal, and including a limiter-discriminator means; inclusive of a limiter means for amplitude limiting; characterized by said limiter means having a variable input-to-output signal transfer response, wherein said amplitude limiting is obtained by AGC action performed by AGC loop feedback, having a loop bandwidth which is substantially equal to baseband bandwidth of a said direct FM modulation component, and having small loop delay; so that said amplitude limiting is effected over the baseband bandwidth of said direct FM modulation component; and characterized by comprising means for maintaining said limiter means substantially linear and absent saturation, at least for low C/N levels of said FM signal; so that said amplitude limiting exhibits suppression of cross-modulation effects deleterious to lowering noise said C/N threshold.

38. A system according to claim 8, further adapted for matching an FM deviation frequency spectrum of a deviation band comprising a said direct FM modulation component of said FM signal, to a bandwidth window of a said direct FM demodulator apparatus responsive to said FM deviation band of said FM signal; further comprising an AFC control loop for controlling center-frequency offset of said FM deviation band of said direct FM modulation component, to stabilize tuning of said FM deviation band; wherein said AFC control loop is characterized by comprising means for generating a D.C. signal to oppose a start-up drift of a D.C. offset of said AFC control loop.

* * * * *